(12) United States Patent
Kondo et al.

(10) Patent No.: US 11,768,697 B2
(45) Date of Patent: Sep. 26, 2023

(54) STORAGE MEDIUM AND CONTAINER MOVING METHOD

(71) Applicant: FUJITSU LIMITED, Kawasaki (JP)

(72) Inventors: Reiko Kondo, Yamato (JP); Yukihiro Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 340 days.

(21) Appl. No.: 17/160,159

(22) Filed: Jan. 27, 2021

(65) Prior Publication Data

US 2021/0294632 A1 Sep. 23, 2021

(30) Foreign Application Priority Data

Mar. 23, 2020 (JP) .................................. 2020-050445

(51) Int. Cl.
*G06F 9/455* (2018.01)
*G06F 9/48* (2006.01)

(52) U.S. Cl.
CPC ........ *G06F 9/45558* (2013.01); *G06F 9/4856* (2013.01); *G06F 9/4881* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 8,191,063 B2 * | 5/2012 | Shingai | ................ | G06F 9/4856 718/1 |
| 8,370,837 B2 * | 2/2013 | Emelianov | .......... | G06F 9/45558 718/1 |
| 9,495,195 B2 * | 11/2016 | Terayama | ............. | G06F 9/5011 |
| 9,575,797 B2 * | 2/2017 | Linton | ................ | G06F 9/45558 |
| 9,594,590 B2 * | 3/2017 | Hsu | ........................ | G06F 9/4856 |

(Continued)

FOREIGN PATENT DOCUMENTS

| | | |
|---|---|---|
| JP | 2017-525232 A | 8/2017 |
| JP | 2017-527151 A | 9/2017 |

(Continued)

OTHER PUBLICATIONS

Zhu, He et al.,"EdgePlace: Availability-aware placement for chained mobile edge applications", Transactions on Emerging Telecommunications Technologies, vol. 29, No. 11, Nov. 1, 2018, pp. 1-20, XP055809272.

(Continued)

*Primary Examiner* — Van H Nguyen
(74) *Attorney, Agent, or Firm* — Fujitsu Patent Center

(57) ABSTRACT

A non-transitory computer-readable storage medium storing a program that causes a computer to execute a process. The process acquires topology information that indicates a calling relationship between containers that operate in a first information processing device. The process also identifies a second container that is one of calls of a first container that calls two or more containers, and a third container that does not call another container based on the topology information. Next, the process moves, to a second information processing device, a container group that is connected by the calling relationship from the second container to the third container.

12 Claims, 35 Drawing Sheets

(56) References Cited

U.S. PATENT DOCUMENTS

| | | | |
|---|---|---|---|
| 9,710,401 B2* | 7/2017 | Rozas | G06F 8/41 |
| 9,766,945 B2* | 9/2017 | Gaurav | G06F 9/5016 |
| 10,007,584 B2* | 6/2018 | Grimm | G06F 11/00 |
| 10,013,213 B2* | 7/2018 | Suresh | G06F 3/0644 |
| 10,162,559 B2* | 12/2018 | Makin | H04L 67/34 |
| 10,601,679 B2* | 3/2020 | Lynar | H04L 67/1008 |
| 10,691,504 B2* | 6/2020 | Liu | H04L 41/5025 |
| 10,824,466 B2* | 11/2020 | Nider | G06F 3/067 |
| 10,922,123 B2* | 2/2021 | Smith, IV | G06F 9/45558 |
| 11,119,976 B2* | 9/2021 | Lemke | G06F 16/119 |
| 2016/0124742 A1 | 5/2016 | Rangasamy et al. | |
| 2016/0337175 A1 | 11/2016 | Rao | |
| 2017/0063722 A1* | 3/2017 | Cropper | H04L 47/82 |
| 2019/0250946 A1* | 8/2019 | Parameshwaran | G06F 9/5088 |

FOREIGN PATENT DOCUMENTS

| | | |
|---|---|---|
| WO | 2016/070145 A1 | 5/2016 |
| WO | 2016/183253 A1 | 11/2016 |

OTHER PUBLICATIONS

Ving-Feng, Wu et al.,"TVM: Tabular VM Migration for Reducing Hop Violations of Service Chains in Cloud Datacenters", 2017 IEEE International Conference On Communications (Icc), IEEE, May 21, 2017, pp. 1-6, XP033132522, [retrieved on 2017/07/28],.
Extended European Search Report dated Jun. 11, 2021 for corresponding European U.S. Appl. No. 21/152,286 7, 9 pages.

* cited by examiner

| CLUSTER | BRANCH ID | BELONGING NODE | END POINT NODE | NODAL NODE |
|---|---|---|---|---|
| | | BRANCH TABLE | | |
| 1 | br1 | C4,C3 | C4 | C3 |
| 1 | br2 | C4,C6,C5 | C4 | C5 |
| 1 | br3 | C4,C6,C5,C3 | C4 | C3 |
| 1 | br4 | C4,C3,C2 | C4 | C2 |
| 1 | br5 | C4,C6,C5,C3,C2 | C4 | C2 |
| 1 | br6 | C9,C7,C2 | C9 | C2 |
| 1 | br7 | C9,C8,C2 | C9 | C2 |
| 1 | br8 | C10,C5 | C10 | C5 |
| 1 | br9 | C10,C5,C3 | C10 | C3 |
| 1 | br10 | C10,C5,C3,C2 | C10 | C2 |
| 2 | br_xx | ... | ... | ... |
| ... | ... | ... | ... | ... |

BRANCH TABLE

| CLUSTER | BRANCH ID | BELONGING NODE | END POINT NODE | NODAL NODE | NUMBER OF EDGES |
|---|---|---|---|---|---|
| 1 | br1 | C4,C3 | C4 | C3 | 1 |
| 1 | br2 | C4,C6,C5 | C4 | C5 | 2 |
| 1 | br3 | C4,C6,C5,C3 | C4 | C3 | 3 |
| 1 | br4 | C4,C3,C2 | C4 | C2 | 2 |
| 1 | br5 | C4,C6,C5,C3,C2 | C4 | C2 | 4 |
| 1 | br6 | C9,C7,C2 | C9 | C2 | 2 |
| 1 | br7 | C9,C8,C2 | C9 | C2 | 2 |
| 1 | br8 | C10,C5 | C10 | C5 | 1 |
| 1 | br9 | C10,C5,C3 | C10 | C3 | 2 |
| 1 | br10 | C10,C5,C3,C2 | C10 | C2 | 3 |
| 2 | br_xx | … | … | … | … |
| … | … | … | … | … | … |

| BRANCH TABLE | | | | | |
|---|---|---|---|---|---|
| CLUSTER | BRANCH ID | BELONGING NODE | END POINT NODE | NODAL NODE | NUMBER OF EDGES |
| 1 | br1 | C4,C3 | C4 | C3 | 1 |
| 1 | br2 | C4,C6,C5 | C4 | C5 | 2 |
| 1 | br3 | C4,C6,C5,C3 | C4 | C3 | 3 |
| 1 | br4 | C4,C3,C2 | C4 | C2 | 2 |
| 1 | br5 | C4,C6,C5,C3,C2 | C4 | C2 | 4 |
| 1 | br6 | C9,C7,C2 | C9 | C2 | 2 |
| 1 | br7 | C9,C8,C2 | C9 | C2 | 2 |
| 1 | br8 | C10,C5 | C10 | C5 | 1 |
| 1 | br9 | C10,C5,C3 | C10 | C3 | 2 |
| 1 | br10 | C10,C5,C3,C2 | C10 | C2 | 3 |
| 2 | br_xx | ... | ... | ... | ... |
| ... | ... | ... | ... | ... | ... |

BRANCH TABLE

| CLUSTER | BRANCH ID | BELONGING NODE | END POINT NODE | NODAL NODE | NUMBER OF EDGES | MOVING PRIORITY |
|---|---|---|---|---|---|---|
| 1 | br1 | C4,C3 | C4 | C3 | 1 | — |
| 1 | br2 | C4,C6,C5 | C4 | C5 | 2 | — |
| 1 | br3 | C4,C6,C5,C3 | C4 | C3 | 3 | — |
| 1 | br4 | C4,C3,C2 | C4 | C2 | 2 | — |
| 1 | br5 | C4,C6,C5,C3,C2 | C4 | C2 | 4 | — |
| 1 | br6 | C9,C7,C2 | C9 | C2 | 2 | 2 |
| 1 | br7 | C9,C8,C2 | C9 | C2 | 2 | 2 |
| 1 | br8 | C10,C5 | C10 | C5 | 1 | 1 |
| 1 | br9 | C10,C5,C3 | C10 | C3 | 2 | — |
| 1 | br10 | C10,C5,C3,C2 | C10 | C2 | 3 | — |
| 2 | br_xx | ... | ... | ... | ... | ... |
| ... | ... | ... | ... | ... | ... | ... |

FIG. 21

| STORAGE UNIT | | | | |
|---|---|---|---|---|
| MOVING CANDIDATE BRANCH TABLE | | | | |
| CLUSTER | BRANCH ID | BELONGING NODE | MOVING TARGET NODE | MOVING PRIORITY |
| 1 | br6 | C9,C7,C2 | C9,C7 | 2 |
| 1 | br7 | C9,C8,C2 | C9,C8 | 2 |
| 1 | br8 | C10,C5 | C10 | 1 |

FIG. 23

STORAGE UNIT 110

DEVICE INFORMATION TABLE 115

| DEVICE NAME | ID | DEVICE TYPE |
|---|---|---|
| container1 | C1 | container |
| container2 | C2 | container |
| ... | ... | ... |
| VM11 | V1 | VM |
| VM12 | V2 | VM |
| ... | ... | ... |
| server21 | S1 | PHYSICAL SERVER |
| server31 | S3 | PHYSICAL SERVER |
| ... | ... | ... |
| switch1 | SW1 | PHYSICAL SWITCH |
| switch2 | SW2 | PHYSICAL SWITCH |
| ... | ... | ... |
| Router | R1 | PHYSICAL ROUTER |
| ... | ... | ... |

BRANCH TABLE

| CLUSTER | BRANCH ID | BELONGING NODE | END POINT NODE | NODAL NODE | NUMBER OF EDGES | MOVING PRIORITY |
|---|---|---|---|---|---|---|
| 1 | br1 | C4,C3 | C4 | C3 | 1 | 3 |
| 1 | br2 | C4,C6,C5 | C4 | C5 | 2 | 4 |
| 1 | br3 | C4,C6,C5,C3 | C4 | C3 | 3 | 5 |
| 1 | br4 | C4,C3,C2 | C4 | C2 | 2 | 6 |
| 1 | br5 | C4,C6,C5,C3,C2 | C4 | C2 | 4 | 6 |
| 1 | br6 | C9,C7,C2 | C9 | C2 | 2 | 2 |
| 1 | br7 | C9,C8,C2 | C9 | C2 | 2 | 2 |
| 1 | br8 | C10,C5 | C10 | C5 | 1 | 1 |
| 1 | br9 | C10,C5,C3 | C10 | C3 | 2 | 5 |
| 1 | br10 | C10,C5,C3,C2 | C10 | C2 | 3 | 6 |
| 2 | br_xx | ... | ... | ... | ... | ... |
| ... | ... | ... | ... | ... | ... | ... |

FIG. 28

STORAGE UNIT 110

MOVING CANDIDATE BRANCH TABLE 114a

| CLUSTER | BRANCH ID | BELONGING NODE | MOVING TARGET NODE | MOVING PRIORITY |
|---|---|---|---|---|
| 1 | br1 | C4,C3 | C4 | 3 |
| 1 | br2 | C4,C6,C5 | C4,C6 | 4 |
| 1 | br3 | C4,C6,C5,C3 | C4,C6,C5 | 5 |
| 1 | br4 | C4,C3,C2 | C4,C3 | 6 |
| 1 | br5 | C4,C6,C5,C3,C2 | C4,C6,C5,C3 | 6 |
| 1 | br6 | C9,C7,C2 | C9,C7 | 2 |
| 1 | br7 | C9,C8,C2 | C9,C8 | 2 |
| 1 | br8 | C10,C5 | C10 | 1 |
| 1 | br9 | C10,C5,C3 | C10,C5 | 5 |
| 1 | br10 | C10,C5,C3,C2 | C10,C5,C3 | 6 |

FIG. 30

STORAGE UNIT 110

MOVING TARGET BRANCH TABLE 117

| CLUSTER | BRANCH ID | BELONGING NODE | MOVING TARGET NODE | MOVING PRIORITY |
|---|---|---|---|---|
| 1 | br1 | C4,C3 | C4 | 3 |
| 1 | br2 | C4,C6,C5 | C4,C6 | 4 |
| 1 | br3 | C4,C6,C5,C3 | C4,C6,C5 | 5 |
| 1 | br6 | C9,C7,C2 | C9,C7 | 2 |
| 1 | br7 | C9,C8,C2 | C9,C8 | 2 |
| 1 | br8 | C10,C5 | C10 | 1 |
| 1 | br9 | C10,C5,C3 | C10,C5 | 5 |

STORAGE MEDIUM AND CONTAINER MOVING METHOD

CROSS-REFERENCE TO RELATED APPLICATION

This application is based upon and claims the benefit of priority of the prior Japanese Patent Application No. 2020-50445, filed on Mar. 23, 2020, the entire contents of which are incorporated herein by reference.

FIELD

The embodiments discussed herein are related to a container moving method and a storage medium.

BACKGROUND

One of virtualization technologies in computers is a technology called container-type virtualization. In the container-type virtualization, a container that collects resources such as a library used to activate an application is defined as a software execution environment. For example, a computer activates the container on a kernel of an Operating System (OS) and executes the software using the container. The container may be executed on the OS that operates on a virtual machine. The container may call another container and cooperate with another container.

For example, an interconnection platform for a cloud service in which a microservice and a workflow are constructed and operated as distributed applications using software containers has been proposed. For example, International Publication Pamphlet No. WO 2016/070145 is disclosed as related art.

SUMMARY

According to an aspect of the embodiments, a non-transitory computer-readable storage medium storing a program that causes a computer to execute a process, the process includes acquiring topology information that indicates a calling relationship between a plurality of containers that operates in a first information processing device; identifying a second container that is one of calls of a first container that calls two or more containers, and a third container that does not call another container based on the topology information; and moving, to a second information processing device, a container group that is connected by the calling relationship from the second container to the third container.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 21 is a diagram illustrating an example of a moving candidate branch table;

FIG. 23 is a diagram illustrating an example of a device information table;

FIG. 28 is a diagram illustrating another example of the moving candidate branch table;

FIG. 30 is a diagram illustrating an example of a moving target branch table;

DESCRIPTION OF EMBODIMENTS

A function may be provided by a plurality of containers in cooperation with each other. Furthermore, the container may be moved to another information processing device according to maintenance, lack of resources, or the like of an information processing device such as a computer that executes the container. For example, when moving a part of a plurality of containers to the other information processing device, it is considered that the moving target container is decided based on a resource amount needed for the container in container units.

However, when the moving target is decided in container units, for example, in a case where two containers has a calling relationship in which an intermediate container interposes between the two containers, there is a possibility that only the intermediate container among these containers is moved to the other information processing device. When the intermediate container is moved to the other information processing device, communication between a moving source information processing device and the other information processing device associated with cooperation between the containers is frequently performed, and there is a possibility that a communication delay time of an entire service provided by the plurality of containers increases. The increase in the communication delay time causes, for example, a timeout or the like. In view of the above, it is desirable to suppress the increase in the communication delay time due to the movement of the container.

Hereinafter, the present embodiment will be described with reference to the drawings.

First Embodiment

A first embodiment will be described.

Figure 1:
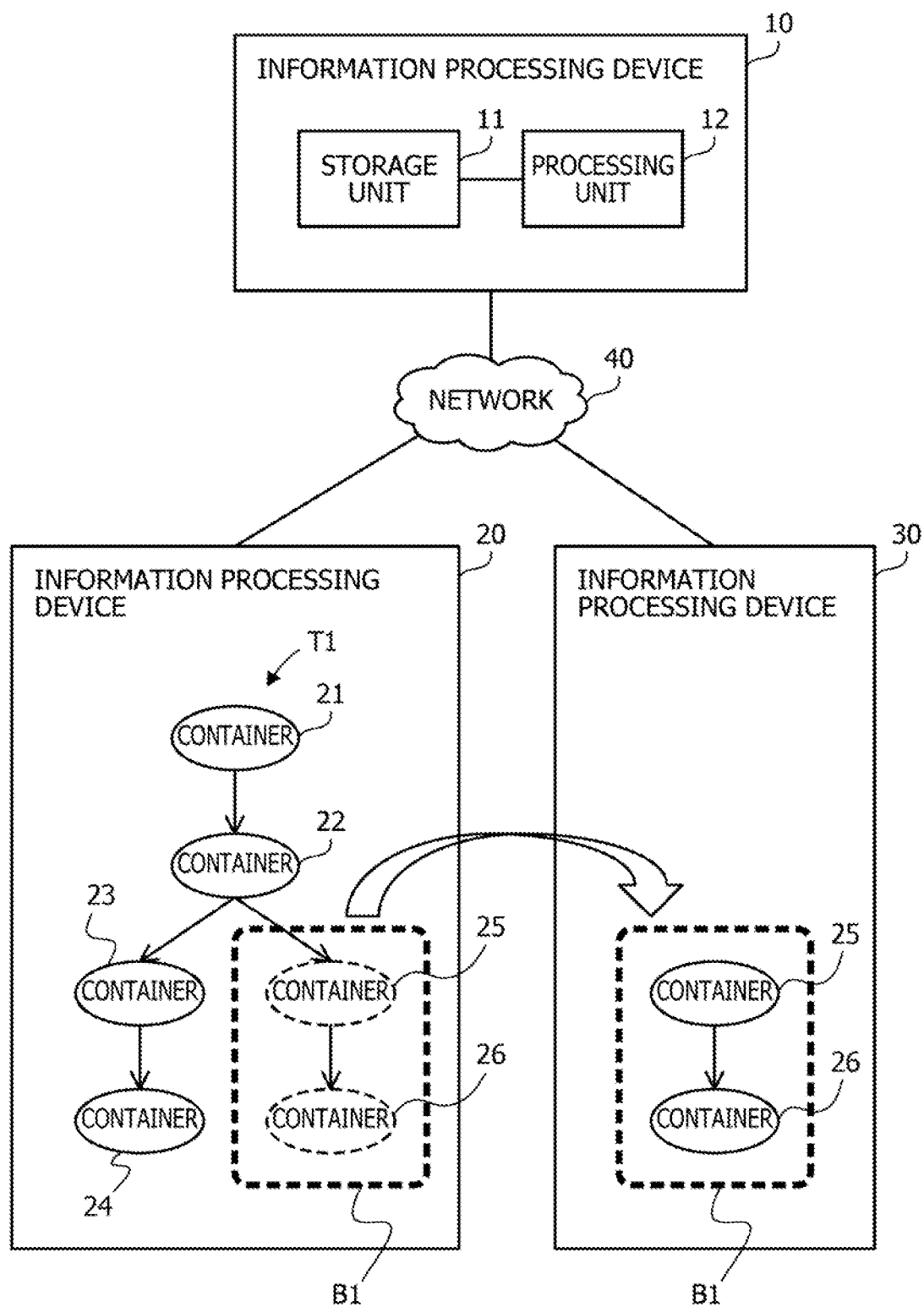
FIG. 1 is a diagram illustrating a processing example of an information processing device according to a first embodiment.

FIG. 1 is a diagram illustrating a processing example of an information processing device according to the first embodiment.

An information processing device 10 controls movement of containers executed by information processing devices 20 and 30. The information processing devices 10, 20, and 30 are connected to a network 40. The network 40 is, for example, a Local Area Network (LAN). The network 40 may be a Wide Area Network (WAN), the Internet, or the like.

The information processing device 10 includes a storage unit 11 and a processing unit 12. The storage unit 11 may be a volatile storage device such as a Random Access Memory (RAM) or may be a non-volatile storage device such as a Hard Disk Drive (HDD) or a flash memory. The processing unit 12 may include a Central Processing Unit (CPU), a Digital Signal Processor (DSP), an Application Specific Integrated Circuit (ASIC), a Field Programmable Gate Array (FPGA), and the like. The processing unit 12 may be a processor that executes a program. The "processor" here may include a set of a plurality of processors (multiprocessor). Although not illustrated, each of the information processing devices 20 and 30 also includes the storage unit such as a RAM and the processing unit such as a processor similarly to the information processing device 10.

The information processing device 20 executes a plurality of containers. The information processing device 20 provides an application or a service that is realized by the plurality of containers working together to a client computer (not illustrated) connected to the network 40. A component or a process provided by each container may be referred to as a microservice, with respect to the service realized by the plurality of containers working together. For example, the information processing device 20 executes processing by the plurality of containers in response to a request received from the client computer and responds a processing result to the client computer.

The plurality of containers may be executed on a virtual machine that operates in the information processing device 20. The plurality of containers includes containers 21 to 26. The container 21 calls the container 22. The container 22 calls the containers 23 and 25. The container 23 calls the container 24. The container 25 calls the container 26. In this way, when the containers cooperate with each other, chained calls are performed between the containers, for example, the first container calls the second container, the second container calls the third container.

A topology T1 is a model indicating a calling relationship between the containers 21 to 26. A calling relationship in which one container calls another container corresponds to a calling relationship in which one microservice calls another microservice.

The topology T1 is represented, for example, by a digraph. The digraph has a structure in which a plurality of nodes is connected by edges. There is a case where the edge is referred to as a link. The edge has an orientation, and is represented by an arrow that starts from a node and ends at another node in the drawing. One node corresponds to one container. The single edge indicates a calling relationship in which a container corresponding to the node at the start point of the edge calls a container corresponding to the node at the end point of the edge.

The storage unit 11 stores topology information that indicates the topology T1. The topology information may be generated by the processing unit 12 on the basis of communication information or the like that is obtained by monitoring communication between the containers 21 to 26 that operate in the information processing device 20 and may be stored in the storage unit 11.

Due to reasons such as lack of resources in the information processing device 20, the processing unit 12 provides a function for selecting a moving target container when a part of the plurality of containers that operates in the information processing device 20 is moved to the information processing device 30.

The processing unit 12 acquires the topology information stored in the storage unit 11. On the basis of the topology information, the processing unit 12 moves a container group, connected by a calling relationship between a second container that is one of callees of a first container that calls two or more containers and a third container that does not call other containers, to the information processing device 30. The calling relationship between the containers is represented by the edge in the topology information. Therefore, it can be said that the container group connected by the calling relationship from the second container to the third container is a container group connected by an edge from the second container to the third container.

For example, first, the processing unit 12 specifies the third container that does not call the other containers based on the topology information. For example, the containers 24 and 26 do not call the other containers. Therefore, the containers 24 and 26 are each example of the third container.

Next, the processing unit 12 specifies the first container that calls two or more containers by tracing a caller from the third container on the basis of the topology information.

The container 24 is considered as an example of the third container. The processing unit 12 specifies the first container by tracing the caller starting from the container 24. A caller of the container 24 is the container 23. One of callees of the container 22 is the container 23. A caller of the container 23 is the container 22. The container 22 calls the containers 23 and 25. Therefore, the container 22 is an example of the first container with respect to the container 24.

Next, the container 26 is considered as an example of the third container. The processing unit 12 specifies the first container by tracing the caller starting from the container 26. A caller of the container 26 is the container 25. One of callees of the container 22 is the container 25. A caller of the container 25 is the container 22. The container 22 calls the containers 23 and 25. Therefore, the container 22 is an example of the first container with respect to the container 26.

The processing unit 12 specifies the second container that is the callee of the first container and that is between the first container and the third container.

For example, the container 23 is a container that is called by the container 22 and is a container between the containers 22 and 24. Therefore, the container 23 is an example of the second container with respect to the container 22 that is an example of the first container and the container 24 that is an example of the third container.

Furthermore, the container 25 is a container that is called by the container 22 and is a container between the containers 22 and 26. Therefore, the container 25 is an example of the second container with respect to the container 22 that is an example of the first container and the container 26 that is an example of the third container.

Note that the processing unit 12 may specify another container group from the second container that is one callee of the first container to the container 24 or the container 26 (third container) by specifying the first container that is an upper container of the container 22 and calls two or more containers by further tracing the container that is a caller of the container 22. However, in the example of the topology T1, the container 21 is the top container and one of the callees of the container 21 is the container 22. Therefore, even when the processing unit 12 searches for the upper container of the container 22, it is not possible to obtain another container group.

Then, the processing unit 12 moves a container group, including the second container and the third container, from the second container to the third container to the information processing device 30. The moving target container group includes all the containers starting from the third container to the second container obtained by tracing the caller. Alternatively, the moving target container group includes all the containers starting from the second container to the third container obtained by tracing the callee. Here, the third container is a container that does not have a callee and a terminal container in the topology T1. Therefore, the container group specified as described above forms a single branch in the topology T1, that is, for example, a branch. Another container group in which the first container is added to the container group from the second container to the third container may be referred to as a branch.

For example, the processing unit 12 moves a container group 81 from the information processing device 20 to the information processing device 30. The container group B1 includes the containers 25 and 26 and does not include the container 22. As described above, the container 25 is an example of the second container. The container 26 is an example of the third container with respect to the container 25.

For example, the processing unit 12 arranges images of the containers 25 and 26 that belong to the container group B1 in the information processing device 30 and activates the containers 25 and 26 in the information processing device 30. At the same time, the processing unit 12 notifies the information processing device 20 to change a communication destination for the container 25 by the container 22 to the information processing device 30. Moreover, the processing unit 12 stops the containers 25 and 26 on the information processing device 20. Therefore, the containers 25 and 26 are moved from the information processing device 20 to the information processing device 30. Furthermore, in the information processing device 20, when the containers 25 and 26 are stopped, resources used for operations of the containers 25 and 26 are released, and a load of the information processing device 20 is reduced.

Note that, in the example in FIG. 1, a container group that includes the containers 23 and 24 may be a moving candidate. In a case where there is a plurality of container groups that is a moving candidate, the processing unit 12 may select one or more container groups to be moved from the plurality of moving candidate container groups according to a predetermined condition.

For example, the processing unit 12 selects the moving target container group so that a use resource amount of the information processing device 20 becomes smaller than a predetermined amount due to the movement of the container group on the basis of a resource amount needed for each container.

As an example, the processing unit 12 may preferentially move a container group that has fewer edges included in the container group among the plurality of moving candidate container groups until the use resource amount of the information processing device 20 falls below the predetermined amount. Furthermore, in a case where the moving target container is not determined by comparing the numbers of edges, the processing unit 12 may preferentially move a container group having a larger or smaller needed resource amount among the plurality of moving candidate container groups until the use resource amount of the information processing device 20 falls below the predetermined amount.

According to the information processing device 10, the topology information that indicates the calling relationship between containers of the plurality of containers that operates in a first information processing device is acquired. On the basis of the topology information, a container group, connected by a calling relationship from the second container that is one of callees of the first container that calls two or more containers to the third container that does not call other containers, is moved to a second information processing device.

As a result, an increase in a communication delay time caused by the movement of the container can be suppressed. Specific description is as follows.

Figure 2A:
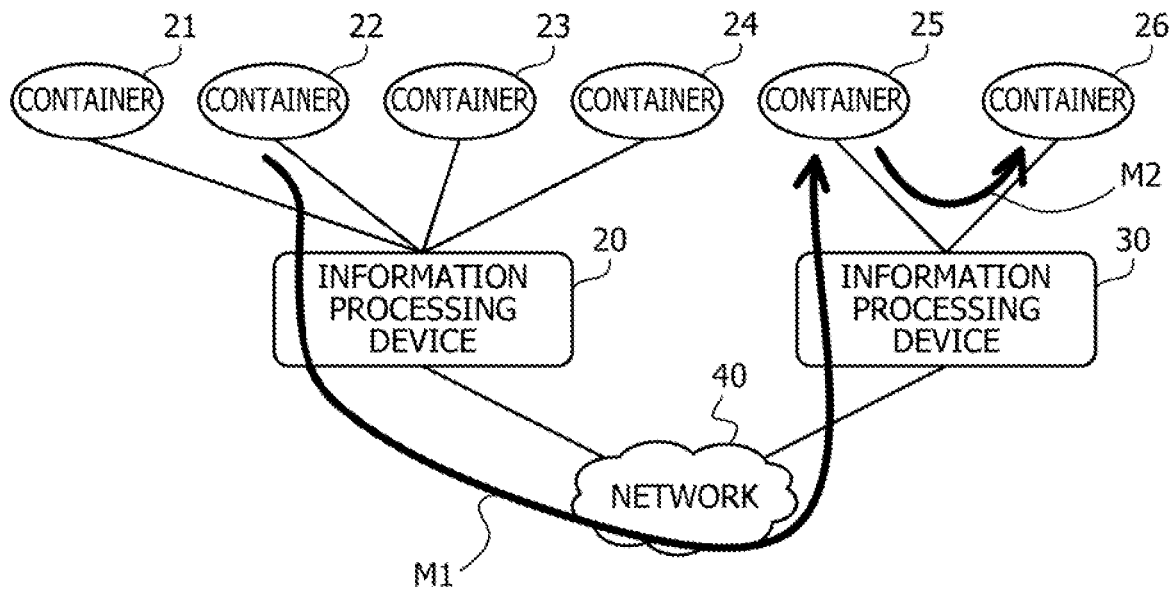
FIGS. 2A and 2B are diagrams illustrating a communication example and a comparative example after a container has been moved.
Figure 2B:
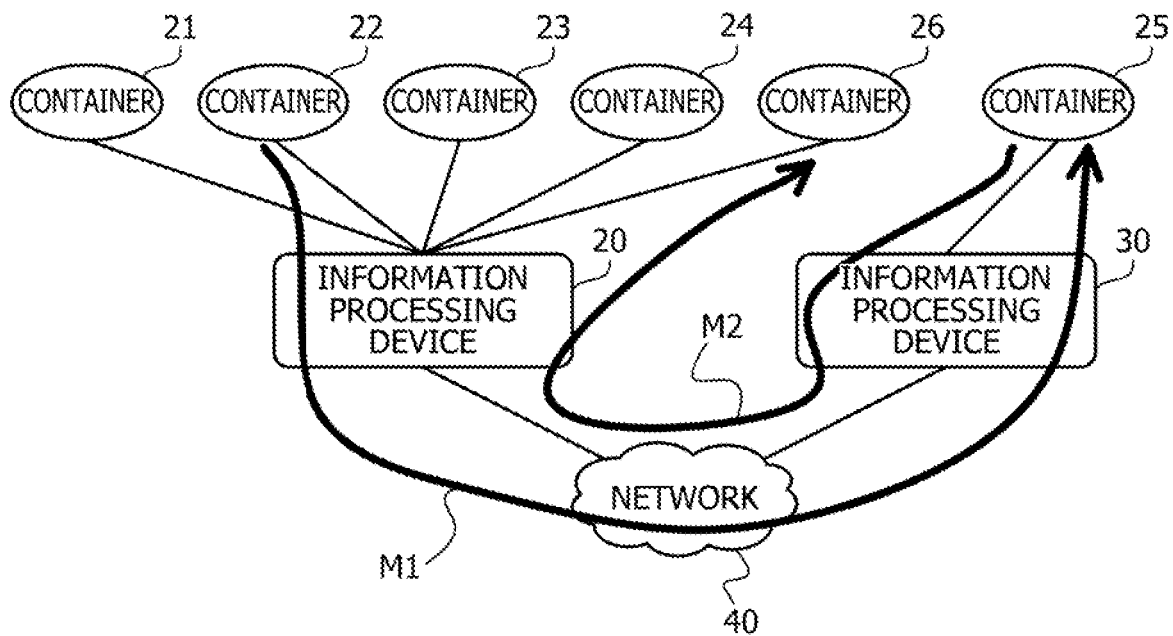

FIGS. 2A and 2B are diagrams illustrating a communication example and a comparative example after the container has been moved.

FIG. 2A illustrates a communication example between the containers in a case where the information processing device 10 moves the containers 25 and 26 from the information processing device 20 to the information processing device 30.

After the containers 25 and 26 have been moved to the information processing device 30, a call M1 of the container 25 by the container 22 passes through the network 40. Because both of the containers 25 and 26 are executed on the information processing device 30, a call M2 of the container 26 by the container 25 does not pass through the network 40. In a case where the container 26 responds to the container 25, the response from the container 26 to the container 25 does not pass through the network 40. In a case where the container 25 responds to the container 22, the response from the container 25 to the container 22 passes through the network 40.

On the other hand, it is considered to decide the moving target container in container units, instead of branch units, when the container is moved from the information processing device 20 to the information processing device 30. In that case, the intermediate container (for example, container 25) interposed between the two containers (for example, containers 22 and 26) is partially moved to the information processing device 30.

FIG. 2B illustrates a communication example between the containers in a case where the container 26 is not moved from the information processing device 20 to the information processing device 30 although the container 25 is moved from the information processing device 20 to the information processing device 30. FIG. 2B is a comparative example of the FIG. 2A.

After the container 25 has been moved to the information processing device 30, the call M1 of the container 25 by the container 22 passes through the network 40. Furthermore, the call M2 of the container 26 by the container 25 passes through the network 40. In a case where the container 26 responds to the container 25, the response from the container 26 to the container 25 passes through the network 40. In a case where the container 25 responds to the container 22, the response from the container 25 to the container 22 also passes through the network 40.

In this way, when only the intermediate container 25 among the containers 22, 25 and 26 that are connected by the calling relationship is moved to the information processing device 30, the communication through the network 40 occurs for the call M2 of the container 26 by the container 25. Furthermore, when the number of intermediate containers increases and the plurality of intermediate containers is moved and distributed to the plurality of information processing devices, communication through the network 40 associated with the cooperation between the containers occurs more frequently.

When the containers cooperate with each other through the network 40, a communication delay time in the network 40 increases a response time of a service provided by the series of containers belonging to the topology T1. If the response time of the service is too long, for example, the response time exceeds an upper limit of the response time allowed for the service, and a possibility that a timeout occurs increases. When the timeout occurs, for example, the container 21 that has received the request from the client computer is not able to appropriately respond to the client computer.

Therefore, the information processing device 10 selects the moving target containers from among the plurality of containers in branch units, for example, units of container group B1 and moves each container (for example, containers 25 and 26) belonging to the selected branch to the same information processing device 30.

With this operation, it is possible to block calling of the intermediate container to the next container through the network 40 as indicated by the call M2 in FIG. 2A. Therefore, the frequency of the communication through the network 40 associated with the cooperation between the containers can be suppressed. Therefore, it is possible to suppress an excess of the response time of the service provided by the series of containers. As a result, for example, it is possible to suppress the timeout caused by lengthening the communication delay time of the entire service due to the movement of the containers.

Furthermore, the information processing device 10 does not assume the first container (for example, container 22) that calls two or more containers as a moving target. This is because, for example, since the container 22 communicates with the container 23 in addition to the container 25, when the container 22 is moved to the information processing device 30, the communication between the information processing devices 20 and 30 occurs more frequently due to the cooperation between the containers 22 and 23. That is, for example, by not assuming that the container 22 as a moving target, the increase in the frequency of the communication between the information processing devices 20 and 30 can be suppressed.

Note that, in a case where there is the plurality of moving candidate container groups, the processing unit 12 selects a moving target container group according to a predetermined condition. In this case, as described above, the processing unit 12 may preferentially move a container group that includes fewer edges among the plurality of moving candidate container groups on the basis of the topology information. In a case where each container that belongs to the topology T1 is executed on the same information processing device 20, it may be considered that a time needed for the communication between the containers is substantially the same. Therefore, it is estimated that, regarding a container group that includes the large number of edges, a total communication time associated with the cooperation between the containers is longer, and a possibility is higher that the longer communication time becomes a bottleneck of the response time of the entire service. Therefore, when the container group that includes the larger number of edges is moved to the other information processing device 30, a possibility that the timeout occurs increases.

Therefore, by preferentially moving the container group that includes fewer edges among the plurality of moving candidate container groups, the increase in the communication delay time of the entire service is suppressed. As a result, for example, the timeout caused by the increase in the communication delay time can be suppressed.

Second Embodiment

Next, a second embodiment will be described.

Figure 3:
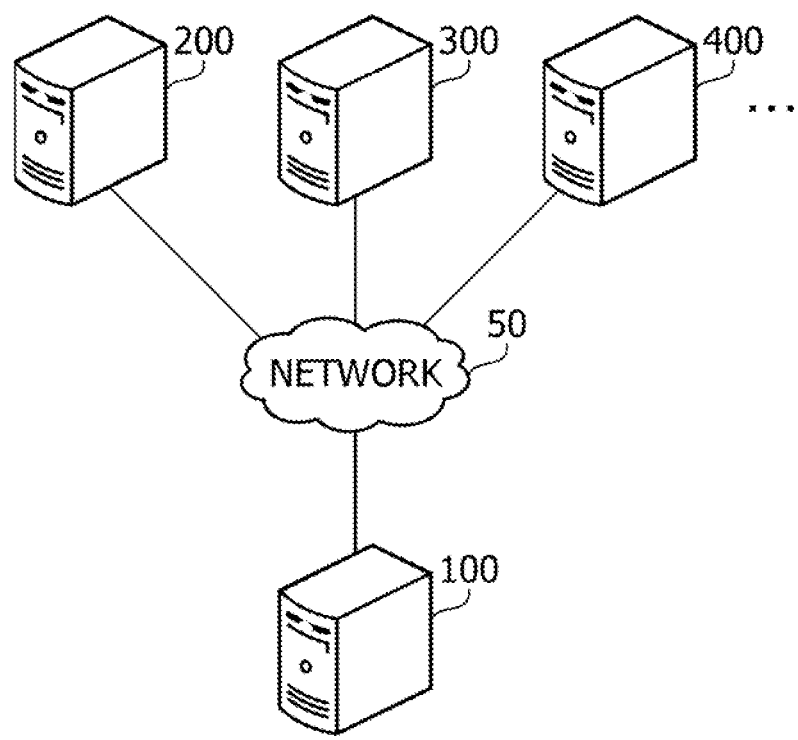
FIG. 3 is a diagram illustrating an example of an information processing system according to a second embodiment.

FIG. 3 is a diagram illustrating an example of an information processing system according to the second embodiment.

The information processing system according to the second embodiment includes a management device 100 and servers 200, 300, 400, . . . . The management device 100 and the servers 200, 300, 400, . . . are connected to a network 50. The network 50 is, for example, a LAN. The network 50 may be a WAN or the Internet.

The management device 100 is a server computer that manages operations of the servers 200, 300, 400, . . . . The management device 100 communicates with the servers 200, 300, 400, . . . via the network 50. The management device 100 manages deployment of containers executed by the servers 200, 300, 400, . . . . The management device 100 monitors operating statuses of the servers 200, 300, 400, . . . . The operating statuses of the servers 200, 300, 400, . . . include loads of a CPU, a RAM, an HDD, a Solid State Drive (SSD), or the like of each of the servers 200, 300, 400, . . . . The load of the CPU is represented by a CPU usage. The loads of storage devices such as the RAM, the HDD, or the SSD are represented by a usage rate or a usage of a storage capacity. The management device 100 moves a container between the servers according to the loads of the servers 200, 300, 400, .... The management device 100 is an example of the information processing device 10 according to the first embodiment.

Each of the servers 200, 300, 400, ... is a server computer that executes the plurality of containers. The servers 200, 300, 400, ... provide services realized by the plurality of containers working together to a client computer (not illustrated) connected to the network 50. For example, the server 200 receives a request for the service from the client computer and responds a processing result by each container according to the service to the request source client computer. A plurality of containers used to provide a service is often deployed in the same server at an initial stage of the provision of the service. The same applies to the servers 300, 400, .... The servers 200, 300, 400, ... are examples of the information processing devices 20 and 30 according to the first embodiment.

Figure 4:
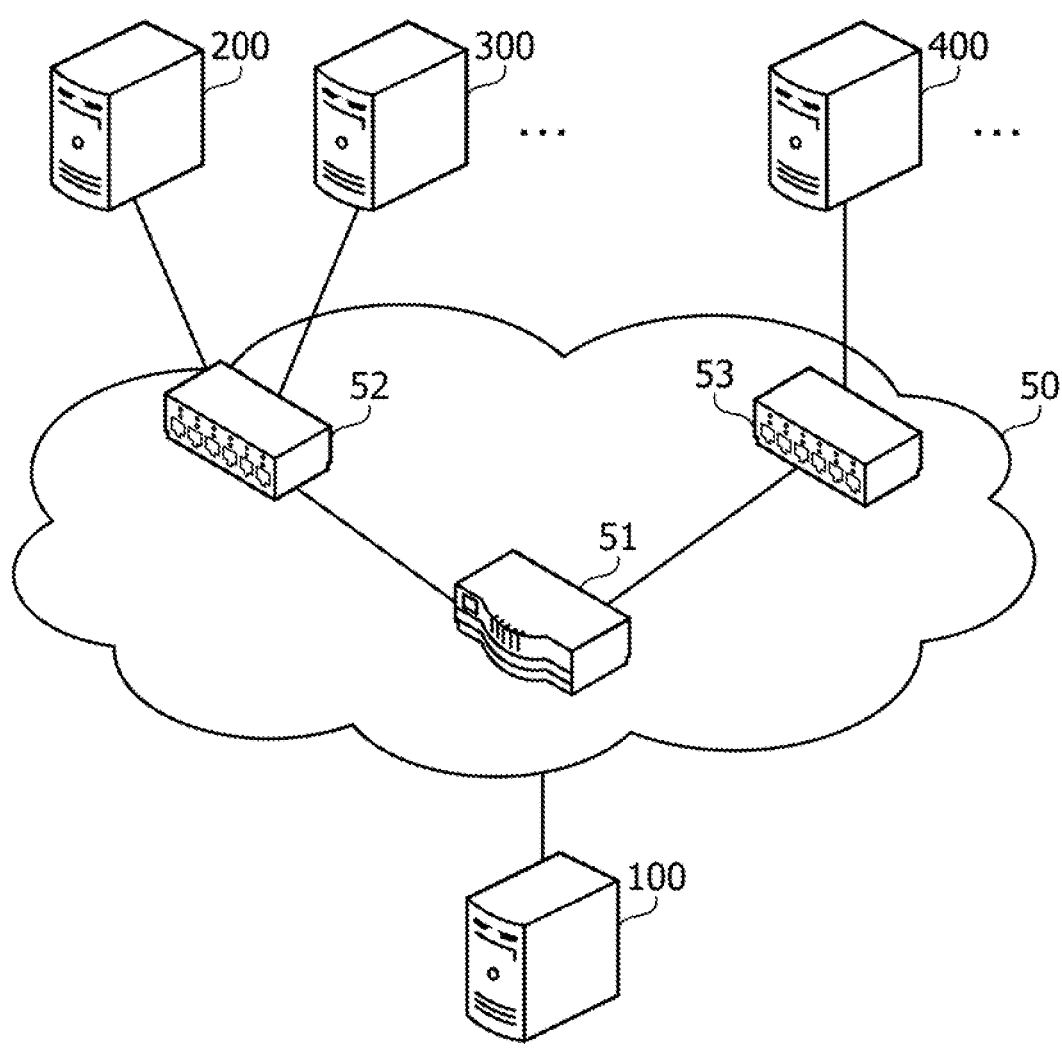
FIG. 4 is a diagram illustrating an example of a network.

FIG. 4 is a diagram illustrating an example of a network.

The network 50 includes a plurality of relay devices such as a router or a switch. The network 50 is formed by connecting the plurality of relay devices using cables.

For example, the network 50 includes a router 51 and switches 52 and 53. The switches 52 and 53 are connected to the router 51. The servers 200, 300, ... are connected to the switch 52. The servers 400, ... are connected to the switch 53. The management device 100 may be connected to any one of the router 51 and the switches 52 and 53 or may be connected to other routers and other switches (not illustrated) in the network 50.

Figure 5:
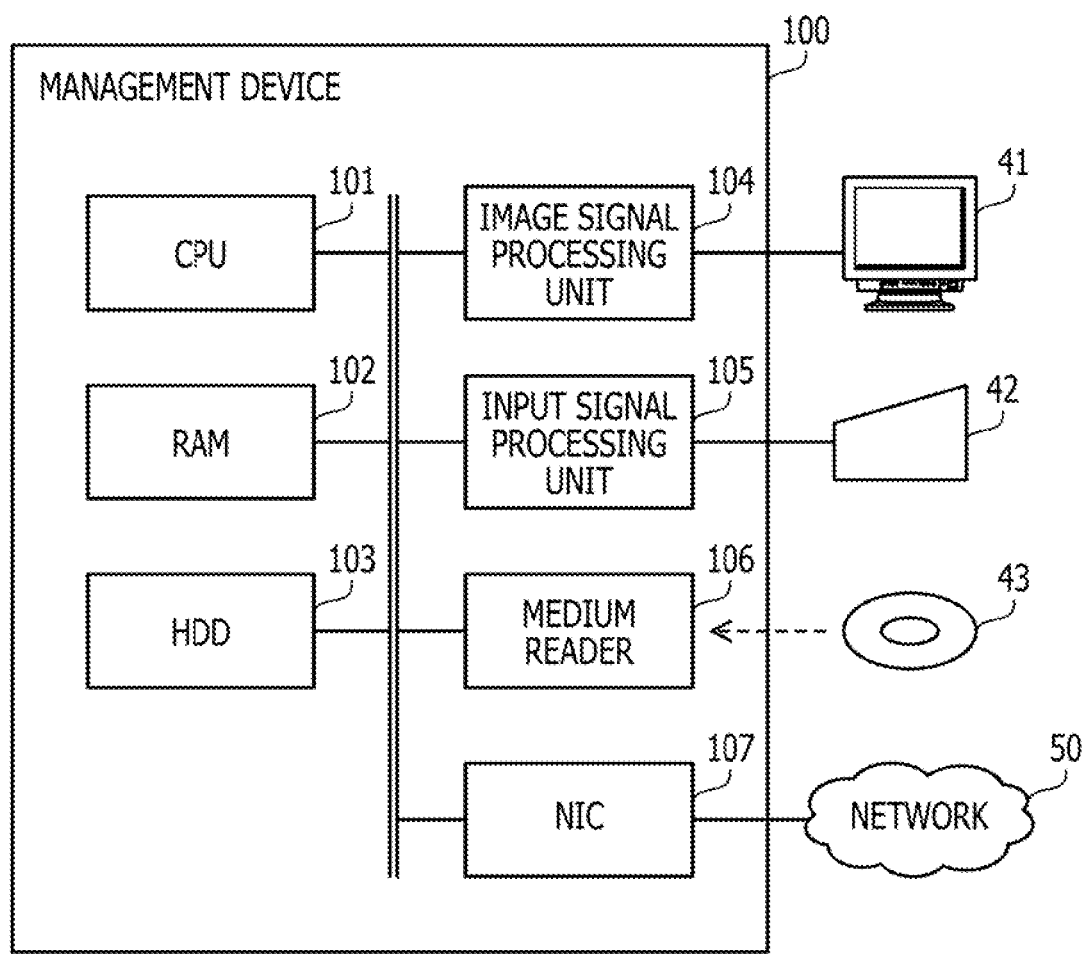
FIG. 5 is a diagram illustrating a hardware example of a management device.

FIG. 5 is a diagram illustrating a hardware example of a management device.

The management device 100 includes a CPU 101, a RAM 102, an HDD 103, an image signal processing unit 104, an input signal processing unit 105, a medium reader 106, and a Network Interface Card (NIC) 107. Note that the CPU 101 is an example of the processing unit 12 according to the first embodiment. The RAM 102 or the HDD 103 is an example of the storage unit 11 according to the first embodiment.

The CPU 101 is a processor that executes a program instruction. The CPU 101 loads at least a part of programs and data stored in the HDD 103 into the RAM 102 and executes the program. Note that the CPU 101 may include a plurality of processor cores. Furthermore, the management device 100 may include a plurality of processors. The processing to be described below may be executed in parallel using a plurality of processors or processor cores. Furthermore, a set of a plurality of processors may be referred to as a "multiprocessor" or simply a "processor".

The RAM 102 is a volatile semiconductor memory that temporarily stores the program executed by the CPU 101 and the data used by the CPU 101 for operations. Note that the management device 100 may include any type of memory other than the RAM, or may include a plurality of memories.

The HDD 103 is a non-volatile storage device that stores a program of software such as an OS, middleware, and application software, and data. Note that the management device 100 may include another type of storage device such as a flash memory or an SSD, and may include a plurality of non-volatile storage devices.

The image signal processing unit 104 outputs an image to a display 41 connected to the management device 100 according to an instruction from the CPU 101. As the display 41, any type of display such as a Cathode Ray Tube (CRT) display, a Liquid Crystal Display (LCD), a plasma display, or an Organic Electro-Luminescence (OEL) display may be used.

The input signal processing unit 105 acquires an input signal from an input device 42 connected to the management device 100 and outputs the input signal to the CPU 101. As the input device 42, a pointing device such as a mouse, a touch panel, a touch pad, and a trackball, a keyboard, a remote controller, a button switch, or the like may be used. Furthermore, a plurality of types of input devices may be connected to the management device 100.

The medium reader 106 is a reading device that reads a program or data recorded in a recording medium 43. As the recording medium 43, for example, a magnetic disk, an optical disk, a Magneto-Optical (MO) disk, a semiconductor memory, or the like may be used. The Magnetic disk includes a Flexible Disk (FD) and an HDD. The optical disk includes a Compact Disc (CD) and a Digital Versatile Disc (DVD).

The medium reader 106 copies, for example, the program and data read from the recording medium 43 to another recording medium such as the RAM 102 or the HDD 103. The read program is executed by the CPU 101, for example. Note that the recording medium 43 may be a portable recording medium, and may be used for distribution of a program or data. Furthermore, the recording medium 43 and the HDD 103 may be sometimes referred to as computer-readable recording media.

The NIC 107 is an interface that is connected to the network 50 and communicates with another computer through the network 50. The NIC 107 is connected to, for example, the relay devices such as the router or the switch in the network 50 by cables.

Note that the servers 200, 300, 400, ... are also realized by hardware similar to that of the management device 100.

Figure 6:
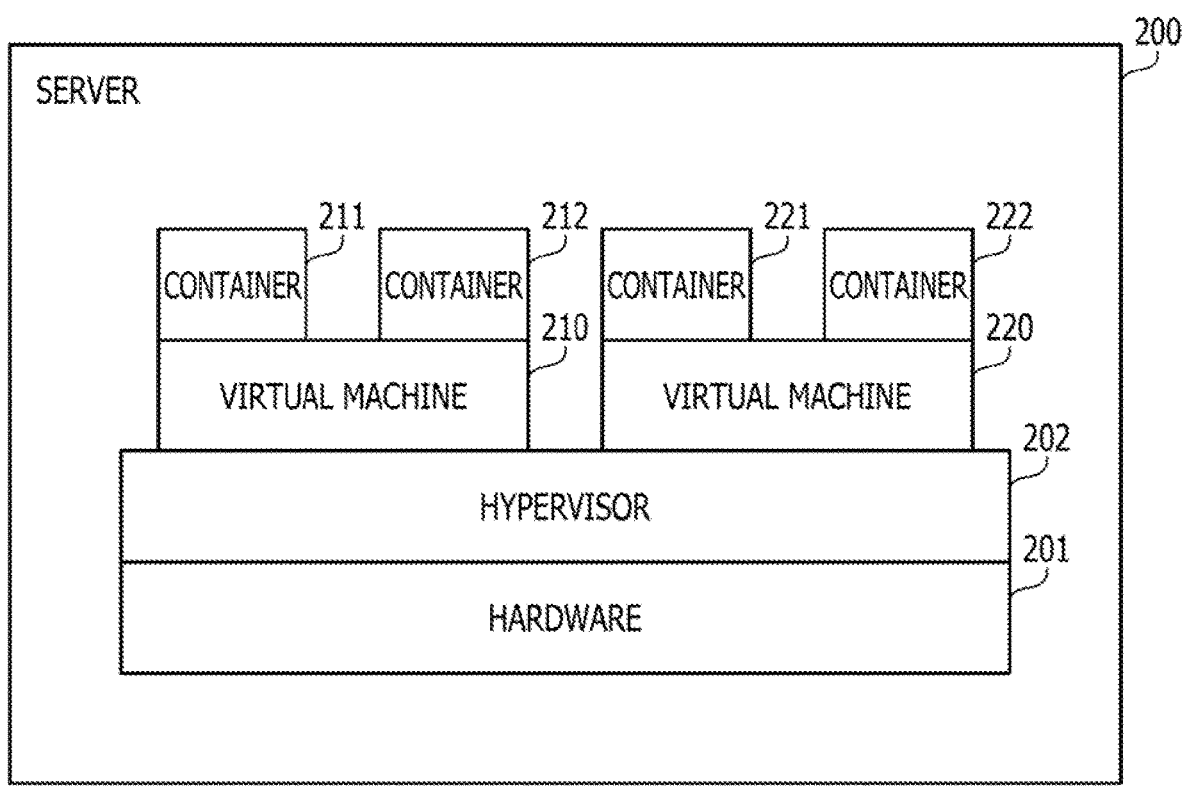
FIG. 6 is a diagram illustrating an example of a virtualization mechanism.

FIG. 6 is a diagram illustrating an example of a virtualization mechanism.

Although the server 200 is illustrated in FIG. 6, each of the servers 300, 400, ... also includes a virtualization mechanism similar to that of the server 200.

The server 200 includes hardware 201, a hypervisor 202, virtual machines 210 and 220, and containers 211, 212, 221, and 222.

The hardware 201 includes a CPU, a RAM, an HDD (or SSD), an NIC, or the like.

The hypervisor 202 is software that allocates resources of the hardware 201 to the virtual machines 210 and 220 and operates the virtual machines 210 and 220 on the server 200.

The virtual machines 210 and 220 are virtual computers that operate on the server 200 that is a physical machine. The virtual machines 210 and 220 activate containers on the OS and executes the software using the containers. In FIG. 6, there is a case where the virtual machine is abbreviated as a "VM" (Virtual Machine).

The containers 211 and 212 are containers executed by the virtual machine 210. The containers 221 and 222 are containers executed by the virtual machine 220. A component provided by the container is referred to as a microservice. The plurality of microservices in the plurality of containers cooperates with each other, and a single application or service may be realized.

Figure 7:
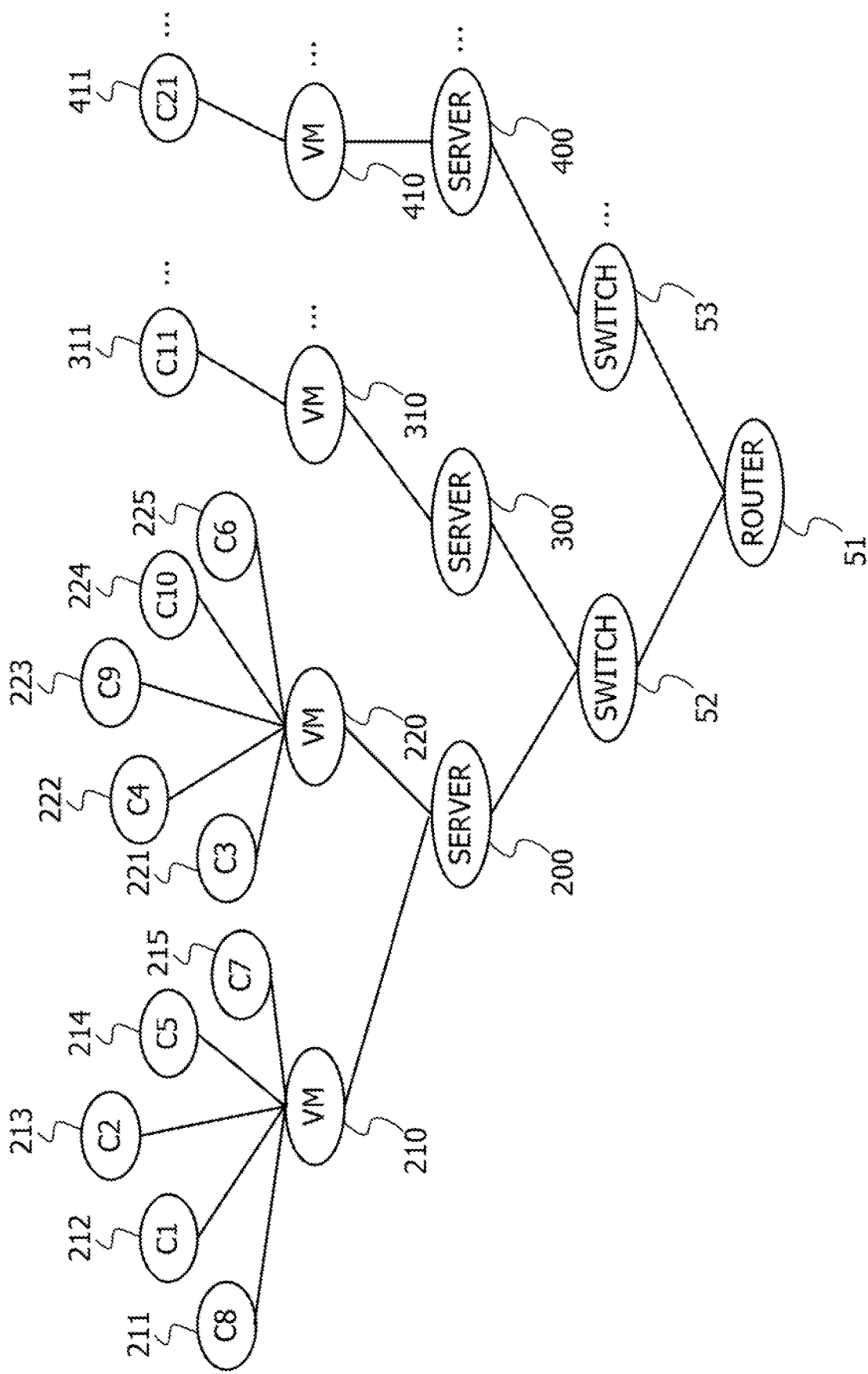
FIG. 7 is a diagram illustrating an example of a container executed by the information processing system.

FIG. 7 is a diagram illustrating an example of a container executed by an information processing system.

The server 200 executes one or more virtual machines including the virtual machines 210 and 220. The virtual machine 210 executes containers 211 to 215.

The virtual machine 220 executes containers 221 to 225.

The server 300 executes one or more virtual machines including a virtual machine 310. The virtual machine 310 executes one or more containers including a container 311.

The server 400 executes one or more virtual machines including a virtual machine 410. The virtual machine 410 executes one or more containers including a container 411.

An Identifier (ID) that is identification information is assigned to a container. An ID of the container 211 is "C8". An ID of the container 212 is "C1". An ID of the container 213 is "C2". An ID of the container 214 is "C5". An ID of the container 215 is "C7". An ID of the container 221 is "C3". An ID of the container 222 is "C4". An ID of the container 223 is "C9". An ID of the container 224 is "C10". An ID of the container 225 is "C6". An ID of the container 311 is "C11". An ID of the container 411 is "C21".

In the following description, the container may be indicated by using the ID. For example, the container 211 may be referred to as a "container C8". The same applies to the other containers.

Figure 8:
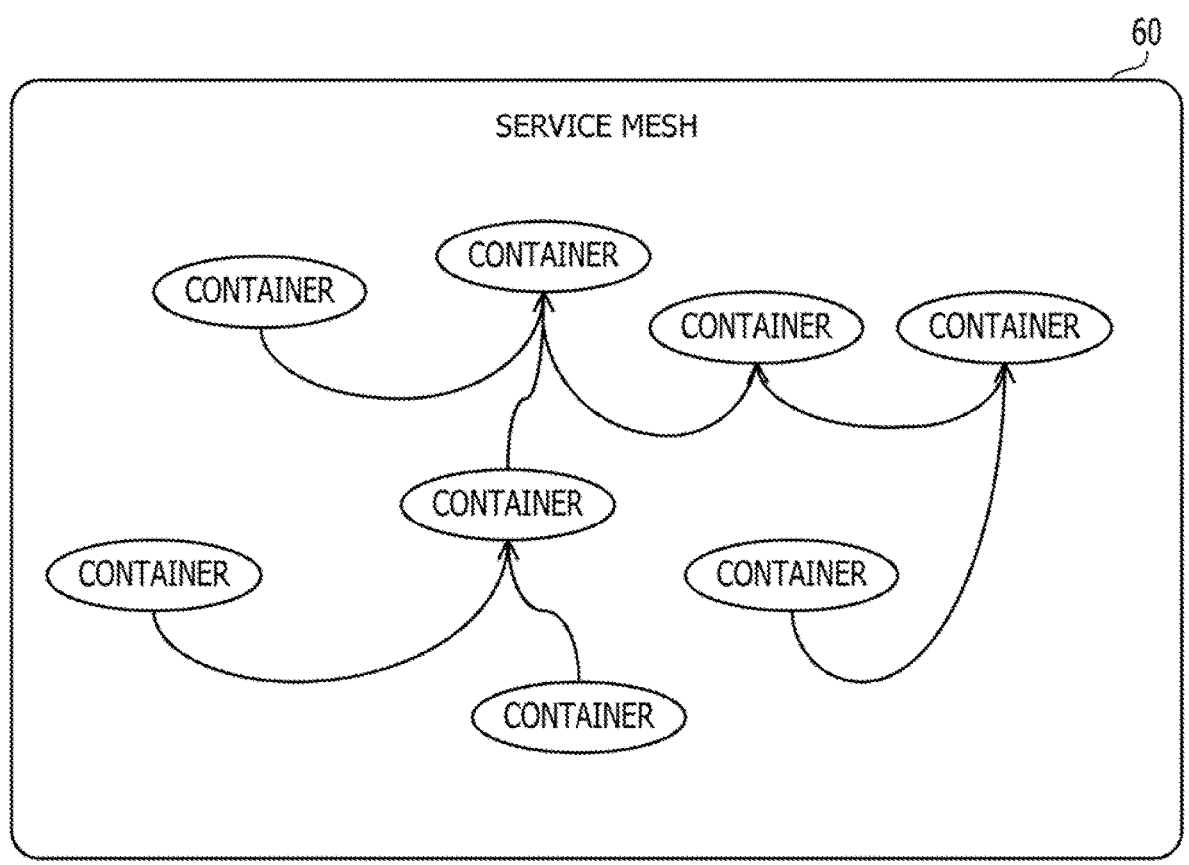
FIG. 8 is a diagram illustrating an example of a service mesh.

FIG. 8 is a diagram illustrating an example of a service mesh.

A service mesh 60 indicates association between a group of containers included in a service realized by the plurality of microservices and containers belonging to the group of containers. The service mesh 60 represents a calling relationship between the containers in the entire service. The service mesh 60 has a structure called topology that indicates the calling relationship between the containers. The number of containers in the service mesh 60 may vary according to an operation of the information processing system.

Figure 9:
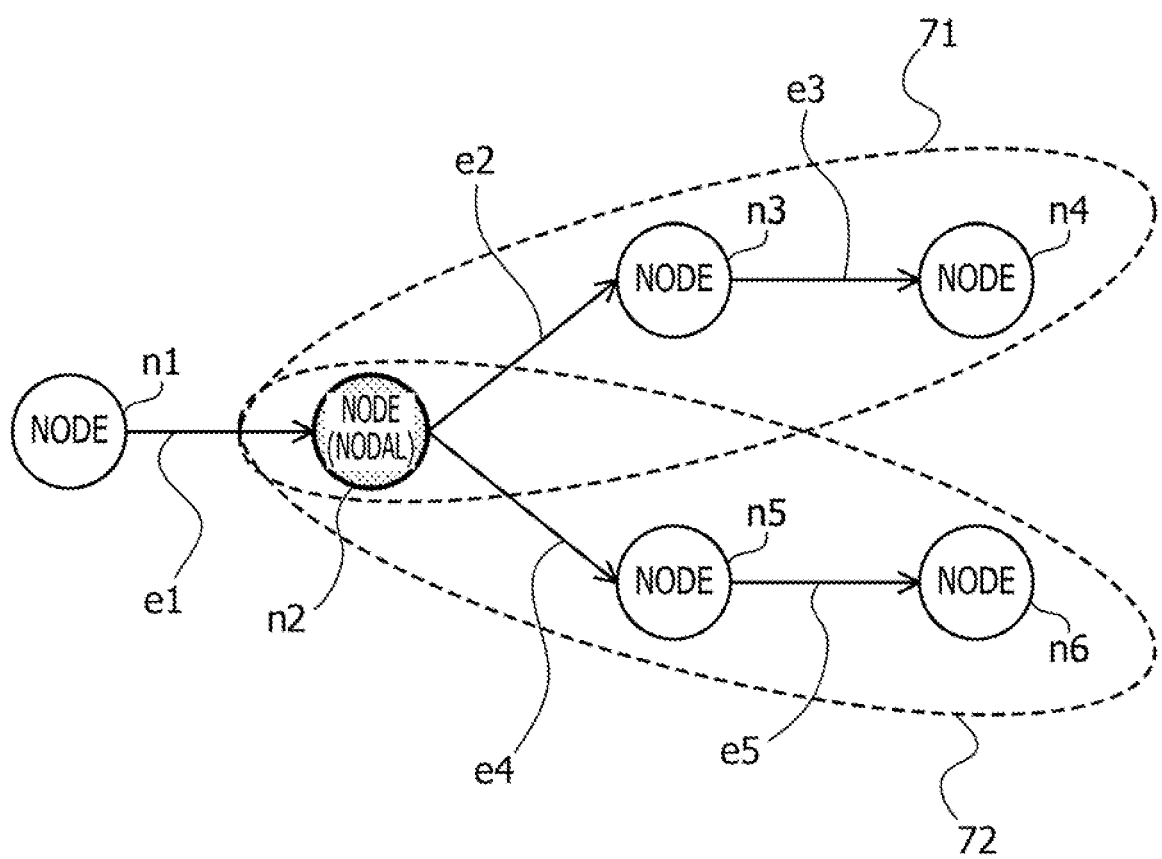
FIG. 9 is a diagram illustrating an example of a digraph.

FIG. 9 is a diagram illustrating an example of a digraph.

The topology indicating the calling relationship between the containers is represented by, for example, a digraph.

The digraph is represented by nodes and an edge that connects between the nodes. The edge has an orientation and is represented by an arrow in FIG. 9.

For example, six nodes n1 to n6 respectively correspond to six containers. The edge indicates a calling relationship in which a container corresponding to a node at the start point of the edge calls a container corresponding to a node at the end point of the edge. For example, a start point of an edge e1 is the node n1, and an end point of the edge e1 is the node n2. A start point of an edge e2 is the node n2, and an end point of the edge e2 is the node n3. A start point of an edge e3 is the node n3, and an end point of the edge e3 is the node n4. A start point of an edge e4 is the node n2, and an end point of the edge e4 is the node n5. A start point of an edge e5 is the node n5, and an end point of the edge e5 is the node n6.

The node to be the start point of the plurality of edges is referred to as a nodal node. For example, the node n2 is a start point of the two edges e2 and e4. Therefore, the node n2 is a nodal node.

A node that does not have a callee container is referred to as an end point node or a terminal node. For example, the nodes n4 and n6 do not serve as the start point of the edges and do not have a callee container. Therefore, the nodes n4 and n6 are the end point nodes.

A node group that is connected by a calling relationship and can be obtained by tracing a caller from the end point node to the nodal node or from the nodal node to the end point node is referred to as a branch. For example, the calling relationship from the nodal node to the end point node, in other words, for example, the nodes n2, n3, and n4 connected by the edges e2 and e3 form a branch 71. It can be said that three containers corresponding to the nodes n2, n3, and n4 form the branch 71.

Furthermore, the calling relationship from the nodal node to the end point node, in other words, for example, the nodes n2, n5, and n6 connected by the edges e4 and e5 form a branch 72. It can be said that three containers corresponding to the nodes n2, n5, and n6 form the branch 72.

Figure 10:
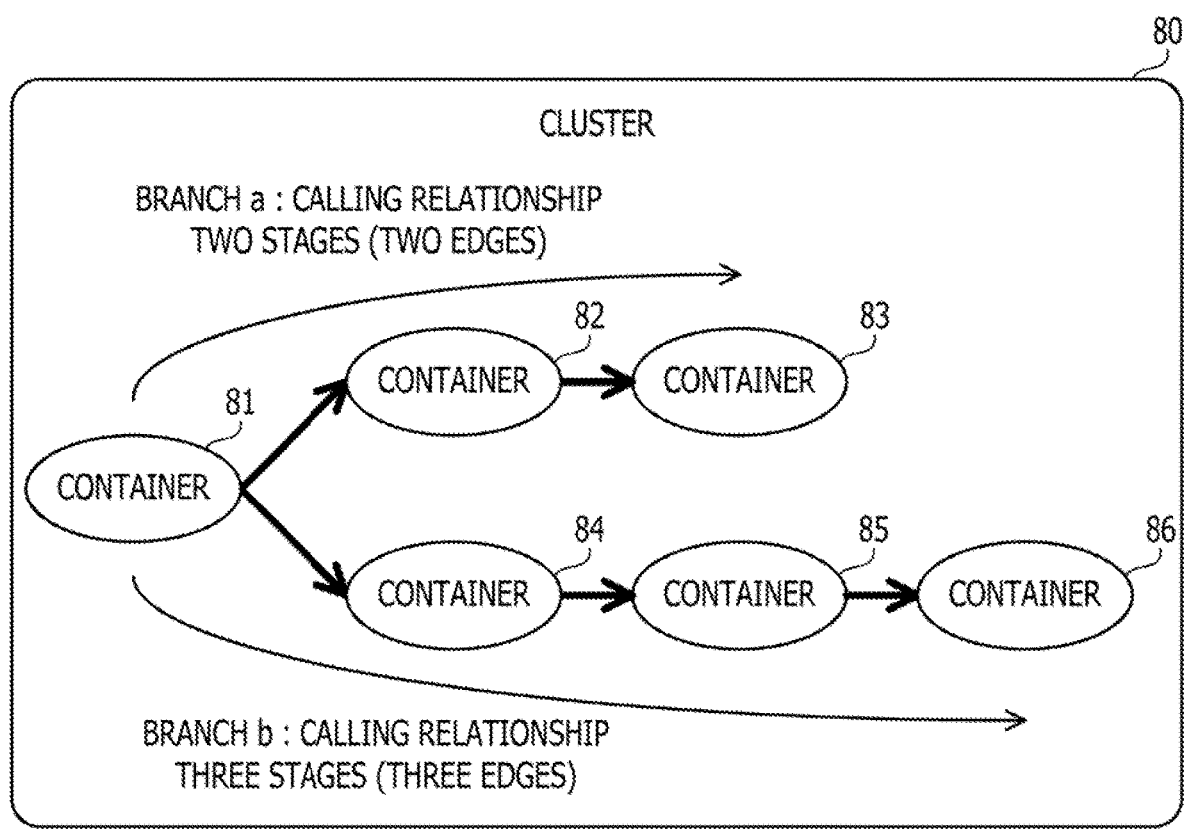
FIG. 10 is a diagram illustrating an example of a duster.

FIG. 10 is a diagram illustrating an example of a duster.

A group of containers connected by the continuous calling relationship forms a single cluster. The "continuous calling relationship" indicates a calling relationship between two or more nodes connected by edges in the topology, in other words, for example, between two or more containers. In the container group connected by the continuous calling relationship, it is possible to trace the edges in a forward or backward direction so as to reach all the other containers that belong to the container group from a container that belongs to the container group.

Therefore, the duster is a set of containers that can be reached by tracing the edges in the calling relationship from a certain container to another container in the topology. The branch is a part of the cluster. The plurality of branches including the containers corresponding to the same nodal node belongs to the same duster. As described above, at the initial stage of start of the service provision, the containers that belong to the same duster, in other words, for example, the containers used to provide the same service are often deployed on the same server.

For example, a duster 80 includes containers 81 to 86. The container 81 calls the containers 82 and 84. The container 82 calls the container 83. The container 83 is a terminal container corresponding to the end point node. The container 84 calls the container 85. The container 85 calls the container 86. The container 86 is a terminal container corresponding to the end point node.

The container 81 is a container corresponding to the nodal node. The containers 81 to 83 form a branch a. The containers 81, 84, 85, and 86 form a branch b.

The branch a includes two edges including an edge that connects between the containers 81 and 82 and an edge that connects between the containers 82 and 83. Therefore, the calling relationship has two stages.

The branch b includes three edges including an edge that connects between the containers 81 and 84, an edge that connects between the containers 84 and 85, and an edge that connects between the containers 85 and 86. Therefore, the calling relationship has three stages. In this way, in the branches a and b that have the container 81 corresponding to the nodal node in common, there is a case where the number of stages of the calling relationship differs.

Next, functions of the management device 100 will be described.

Figure 11:
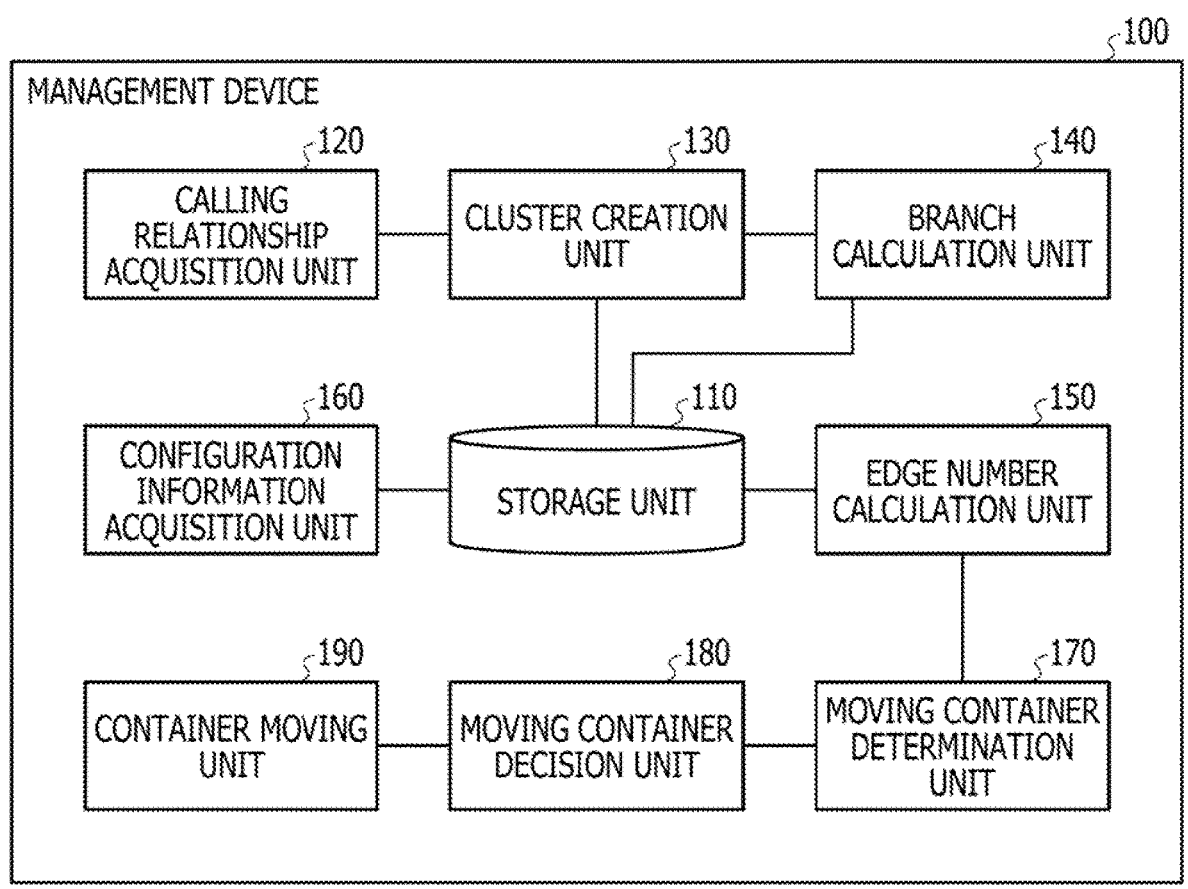
FIG. 11 is a diagram illustrating a functional example of the management device.

FIG. 11 is a diagram illustrating a functional example of a management device.

The management device 100 includes a storage unit 110, a calling relationship acquisition unit 120, a duster creation unit 130, a branch calculation unit 140, an edge number calculation unit 150, a configuration information acquisition unit 160, a moving container determination unit 170, a moving container decision unit 180, and a container moving unit 190.

As the storage unit 110, a storage region of the RAM 102 or the HDD 103 is used. The calling relationship acquisition unit 120, the duster creation unit 130, the branch calculation unit 140, the edge number calculation unit 150, the configuration information acquisition unit 160, the moving container determination unit 170, the moving container decision unit 180, and the container moving unit 190 are realized by the CPU 101. For example, the calling relationship acquisition unit 120, the duster creation unit 130, the branch calculation unit 140, the edge number calculation unit 150, the configuration information acquisition unit 160, the moving container determination unit 170, the moving container decision unit 180, and the container moving unit 190 are realized by executing a program stored in the storage unit 110 by the CPU 101.

The storage unit 110 stores various information including node information, topology information, branch information, moving candidate branch information, and system configuration information. The node information is information that includes a name and an ID of a container. The topology information is information regarding a topology that indicates a calling relationship between containers. The branch information is information regarding a branch in the topology. The moving candidate branch information is information indicating a moving candidate branch. The system configuration information is information indicating a connection relationship between a container, a virtual machine, a server, a switch, a router, or the like included in the information processing system.

Furthermore, the storage unit 110 stores information regarding a needed resource amount such as a CPU usage, use capacity of a RAM, an HDD, an SSD, or the like needed for an operation of the container, for each container.

The calling relationship acquisition unit 120 generates the topology information that indicates calling relationships of all the containers included in the information processing system on the basis of communication information obtained by monitoring communication between the containers included in the information processing system and the node information and stores the topology information in the storage unit 110. For example, the calling relationship acquisition unit 120 converts the name of the container included in the communication information into the ID of the container included in the node information and associates an ID of a communication source when the container is called with an ID of a communication destination so as to generate the topology information. The calling relationship acquisition unit 120 may use, for example, "Kiali" or the like as a tool to obtain the calling relationship between the containers.

The duster creation unit 130 creates a duster by a group of containers connected by the continuous calling relationship on the basis of the topology information stored in the storage unit 110. The duster creation unit 130 records information regarding a duster to which each container belongs in the topology information.

The branch calculation unit 140 calculates a branch that belongs to the duster and generates the branch information for each duster on the basis of the topology information and stores the branch information in the storage unit 110.

The edge number calculation unit 150 calculates the number of edges included in the branch on the basis of the topology information and records the calculated number of edges in the branch information.

The configuration information acquisition unit 160 acquires the system configuration information of the information processing system and stores the acquired system configuration information in the storage unit 110.

The moving container determination unit 170 determines a moving candidate branch on the basis of the branch information stored in the storage unit 110 and generates the moving candidate branch information that indicates the moving candidate branch. The moving container determination unit 170 stores the moving candidate branch information in the storage unit 110.

The moving container decision unit 180 acquires current loads of the servers 200, 300, 400, . . . . The moving container decision unit 180 decides a container to be moved from a certain server to another server on the basis of the current loads of the servers 200, 300, 400, . . . and the system configuration information and the moving candidate branch information stored in the storage unit 110. The moving container decision unit 180 instructs the container moving unit 190 to move the decided container.

The container moving unit 190 moves the container instructed by the moving container decision unit 180 from a moving source server to a moving destination server. The container moving unit 190 uses the system configuration information to decide the moving destination server. For example, in a case where there is a plurality of moving destination server candidates, the container moving unit 190 preferentially selects a server that has fewer relay devices that relay to and from the moving source server as a moving destination server. As the number of relay devices, through which communication is performed, in a communication path is larger, communication between the servers takes more time. Therefore, by preferentially selecting the server that has fewer relay devices, through which the communication is performed, as the moving destination server, a delay time caused by the communication between the servers can be reduced.

Next, a processing procedure of the management device 100 will be described.

Figure 12:
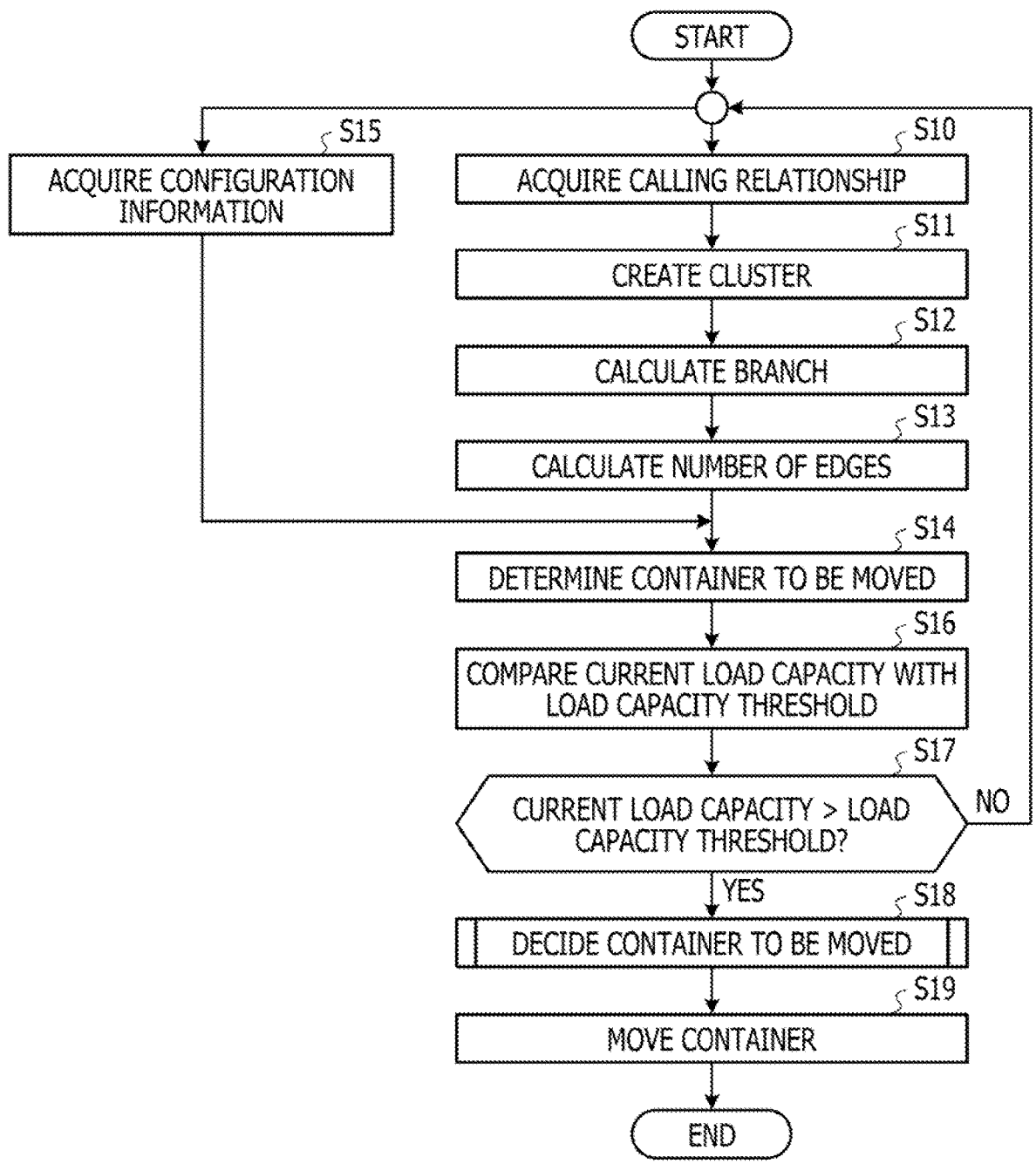
FIG. 12 is a flowchart illustrating a processing example of the management device.

FIG. 12 is a flowchart illustrating a processing example of the management device.

For example, the management device 100 periodically executes the following procedure.

(S10) The calling relationship acquisition unit 120 acquires the calling relationship between the containers included in the information processing system and generates the topology information. The calling relationship acquisition unit 120 stores the generated topology information in the storage unit 110.

(S11) The cluster creation unit 130 creates a duster on the basis of the topology information. The duster creation unit 130 records information regarding a duster to which each container belongs in the topology information.

(S12) The branch calculation unit 140 calculates the branch that belongs to the duster for each duster on the basis of the topology information and generates the branch information that indicates the branch. The branch calculation unit 140 stores the generated branch information in the storage unit 110.

(S13) The edge number calculation unit 150 calculates the number of edges for each branch on the basis of the branch information. The edge number calculation unit 150 records the calculated number of edges in the branch information.

(S14) The moving container determination unit 170 determines the moving candidate branch on the basis of the branch information and generates the moving candidate branch information that indicates the moving candidate branch for each duster. The moving container determination unit 170 stores the moving candidate branch information in the storage unit 110. Then, the processing proceeds to step S16.

(S15) The configuration information acquisition unit 160 acquires the system configuration information of the information processing system and stores the acquired system configuration information in the storage unit 110. Step S15 may be executed in parallel with steps S10 to S14.

(S16) The moving container decision unit 180 compares a current load capacity and a load capacity threshold of each server. The load capacity is an index of a load of a CPU, a RAM, an HDD, an SSD, or the like. For example, the load capacity of the CPU is a CPU usage. The load capacity of the storage devices such as the RAM, the HDD, or the SSD is a usage or a usage size of the storage capacity. The load capacity threshold is a threshold determined with respect to the load capacity in advance. The load capacity threshold is determined for each server in advance.

(S17) In the comparison in step S16, the moving container decision unit 180 determines whether or not a current load capacity of any one of the servers is larger than the load capacity threshold of the server. In a case where the current load capacity of any one of the servers is larger than the load capacity threshold of the server, the processing proceeds to step S18. In a case where the current load capacities of all the servers are equal to or less than the load capacity threshold of the servers, the procedure in FIG. 12 is executed from the beginning after a predetermined time has elapsed.

(S18) The moving container decision unit 180, in step S17, executes moving container decision processing on the basis of the moving candidate branch information on the server of which the current load capacity is determined to be larger than the load capacity threshold. Details of the moving container decision processing will be described later.

(S19) The moving container decision unit 180 instructs the container moving unit 190 to move the container decided in step S18. The container moving unit 190 moves the instructed container from the moving source server to the moving destination server. As described above, the container moving unit 190 decides the moving destination server on the basis of the system configuration information.

Next, the processing of steps S10 to S19 described above will be specifically described. First, an example of the topology regarding the container will be described.

Figure 13:
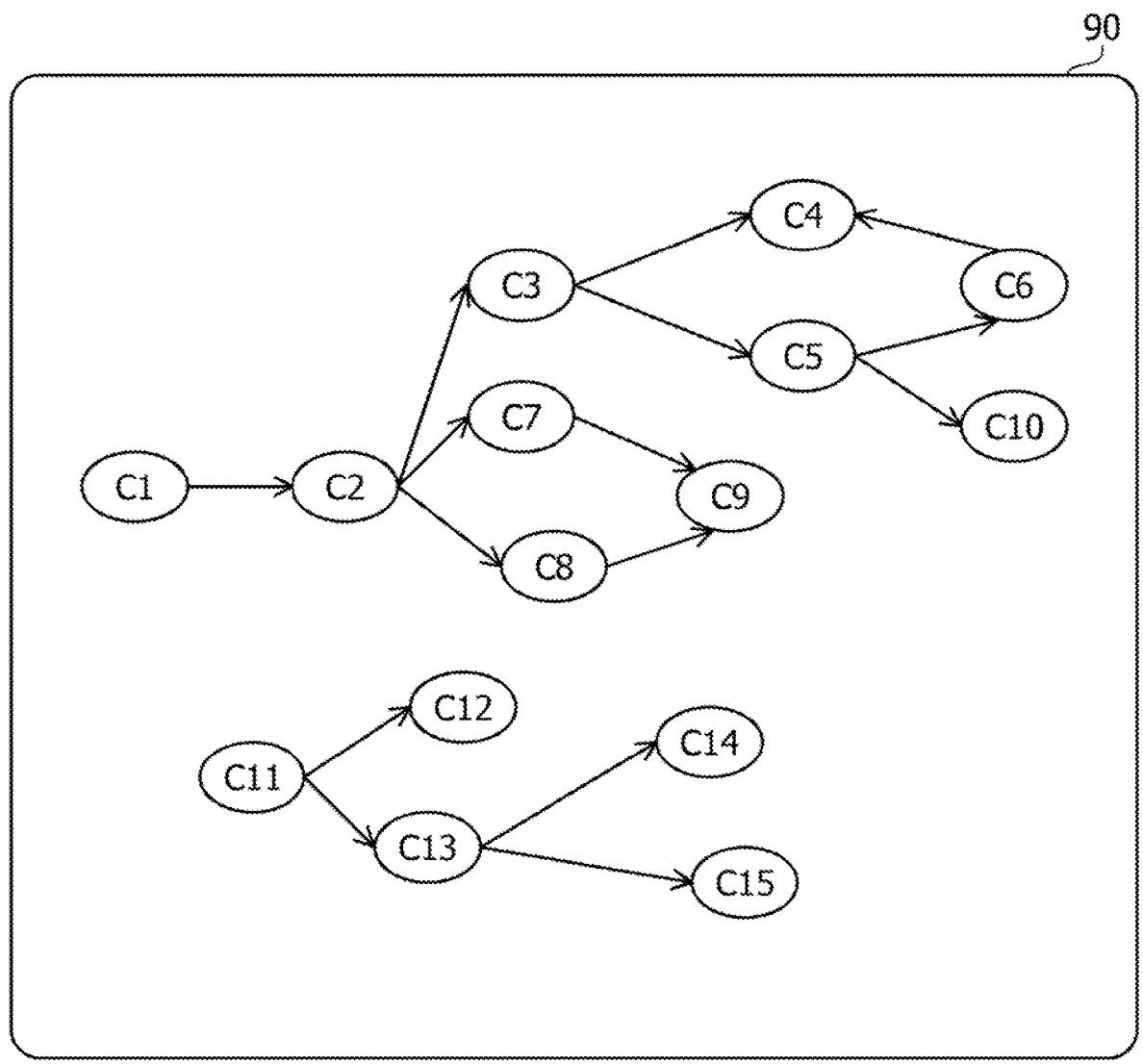
FIG. 13 is a diagram illustrating an example of a topology indicating a calling relationship of containers.

FIG. 13 is a diagram illustrating an example of a topology that indicates a calling relationship between containers.

A topology 90 indicates an example of a calling relationship between the containers for each container on the servers 200, 300, 400, . . . .

The container C1 calls the container C2. The container C2 calls the containers C3, C7, and C8. The container C3 calls the containers C4 and C5. The container C5 calls the containers C6 and C10. The container C6 calls the container C4. The container C7 calls the container C9. The container C8 calls the container C9.

The container C11 calls the containers C12 and C13. The container C13 calls the containers C14 and C15.

Although the topology 90 may include another container such as a container C21, the other container is not illustrated in FIG. 13.

Figure 14:
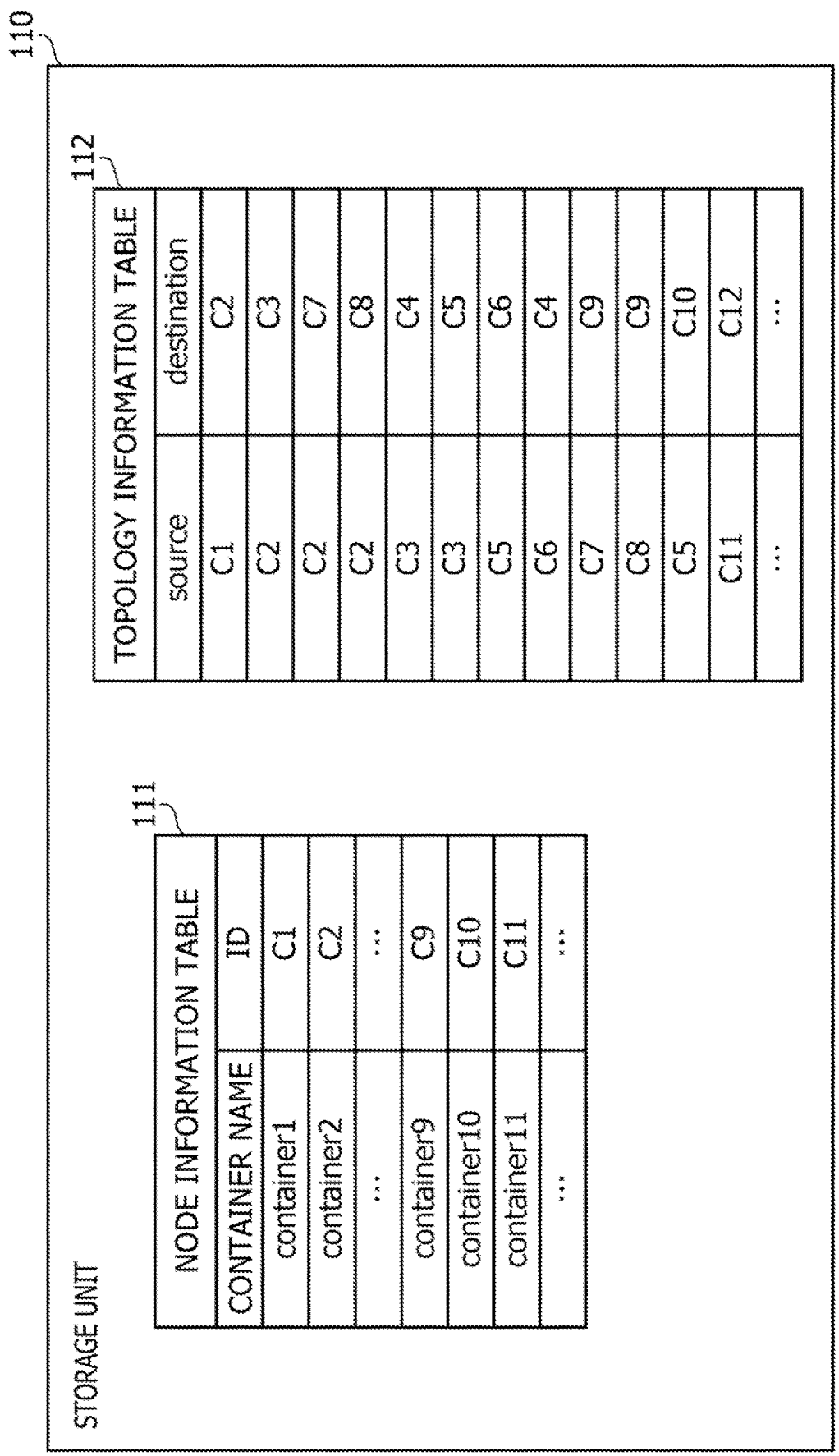
FIG. 14 is a diagram illustrating examples of a node information table and a topology information table.

FIG. 14 is a diagram illustrating examples of a node information table and a topology information table.

A node information table 111 is an example of the node information. A topology information table 112 is an example of the topology information that indicates the topology 90. The node information table 111 is stored in the storage unit 110 in advance. The topology information table 112 is generated by the calling relationship acquisition unit 120 and is stored in the storage unit 110.

The node information table 111 includes items of a container name and an ID. In the item of the container name, a name of a container is registered. In the item of the ID, an ID of a container is registered. For example, in the node information table 111, a record that has a container name "container1" and an ID "C1" is registered. In the node information table 111, the container name and the ID of other container are similarly registered in association with each other.

The topology information table 112 includes items of source and destination. In the item of source, an ID of a caller container is registered. In the item of destination, an ID of a callee container is registered. For example, in the topology information table 112, a record that has source "C" and destination "C2" is registered. This record indicates that the container C1 calls the container C2. The record corresponds to an edge that indicates that the container C1 calls the container C2. Similarly, in the topology information table 112, regarding a calling relationship between the other containers, the ID of the caller container and the ID of the callee container are registered in association with each other.

Figure 15:
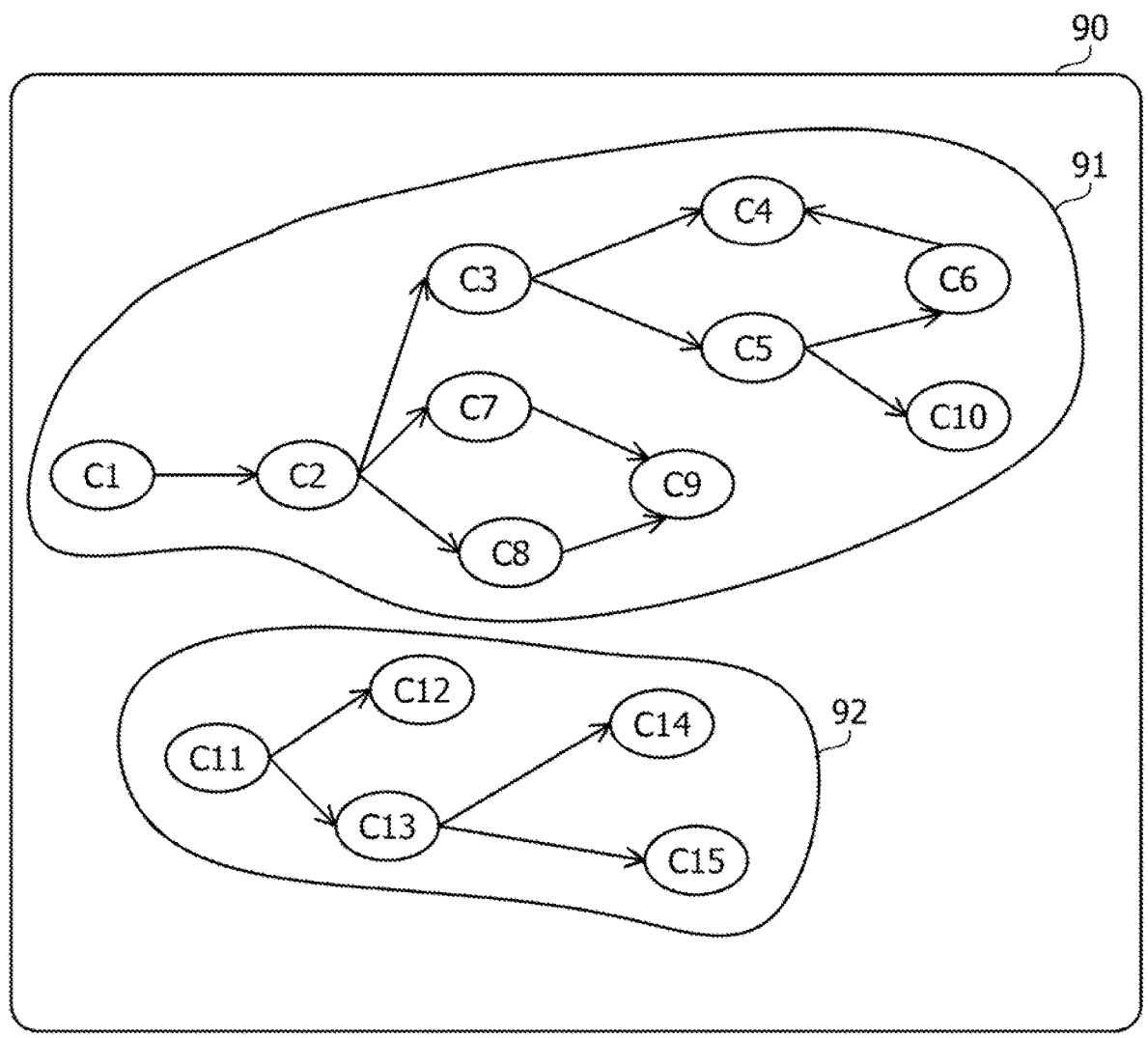
FIG. 15 is a diagram illustrating an example of clustering based on topology information.

FIG. 15 is a diagram illustrating an example of clustering based on the topology information.

The cluster creation unit 130 divides the containers C1 to C15 included in the topology 90 into clusters 91 and 92 on the basis of the topology information table 112. The containers C1 to C10 correspond to the group of containers connected by the continuous calling relationship. Therefore, the cluster creation unit 130 classifies the containers C1 to C10 into the cluster 91. The containers C11 to C15 correspond to the group of containers connected by the continuous calling relationship. Therefore, the cluster creation unit 130 classifies the containers C11 to C15 Into the cluster 92. The cluster creation unit 130 adds information regarding the clusters to the topology information table 112.

Figure 16:
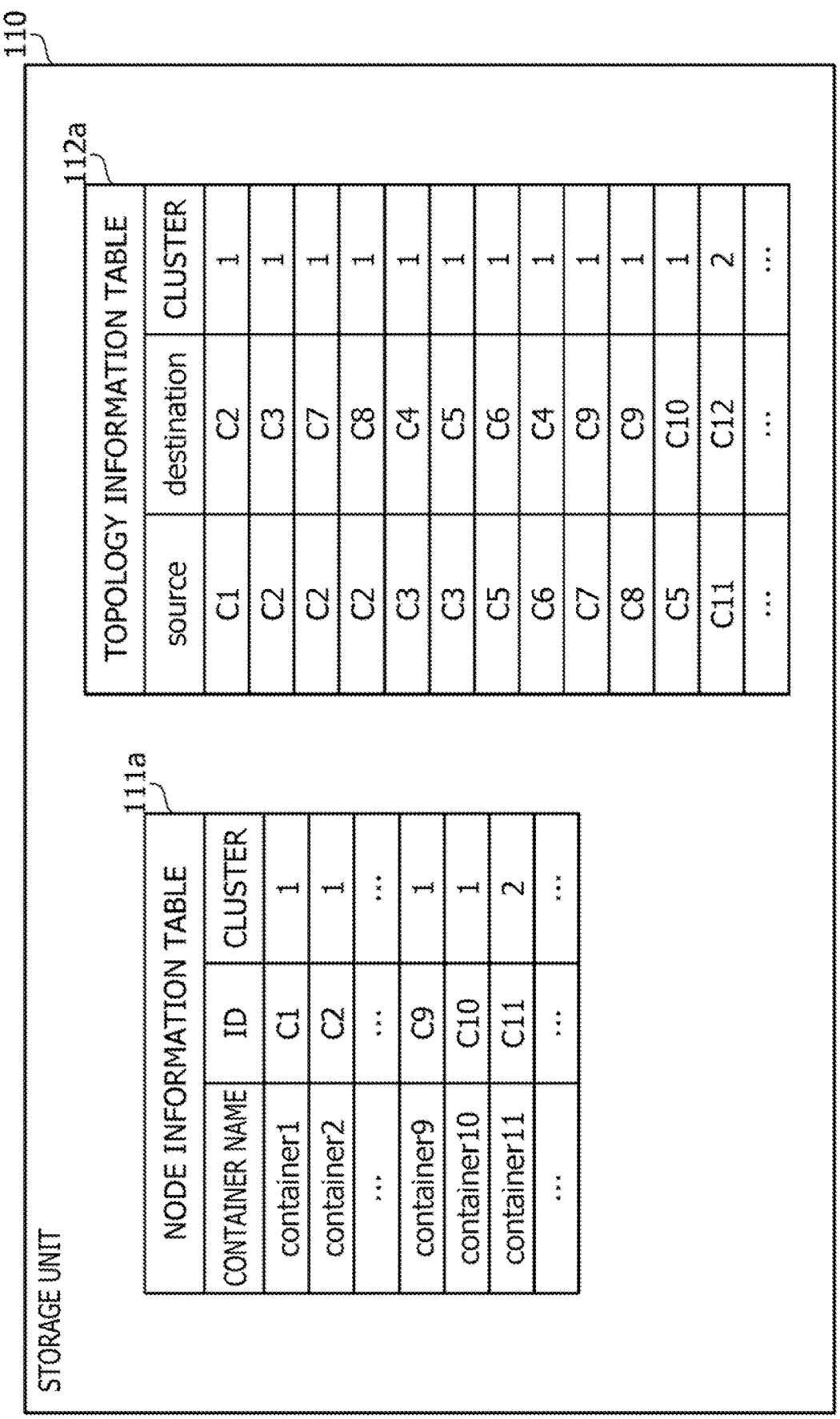
FIG. 16 is a diagram illustrating an example of adding duster information to the topology information.

FIG. 16 is a diagram illustrating an example of adding the cluster information to the topology information.

A node information table 111a and a topology information table 112a are respectively different from the node information table 111 and the topology information table 112 in that an item of a cluster is included. For example, the cluster creation unit 130 assigns a cluster number "1" to the cluster 91 and assigns a cluster number "2" to the cluster 92.

In this case, the cluster creation unit 130 records "1" in the item of the cluster for the container that belongs to the cluster 91 in the node information table 111a and records "2" in the item of the cluster for the container that belongs to the cluster 92.

Furthermore, the cluster creation unit 130 records "1" in the item of the cluster for a pair of containers that belong to the cluster 91 in the topology information table 112a and records "2" in the item of the cluster for a pair of containers that belong to the cluster 92.

Figure 17:
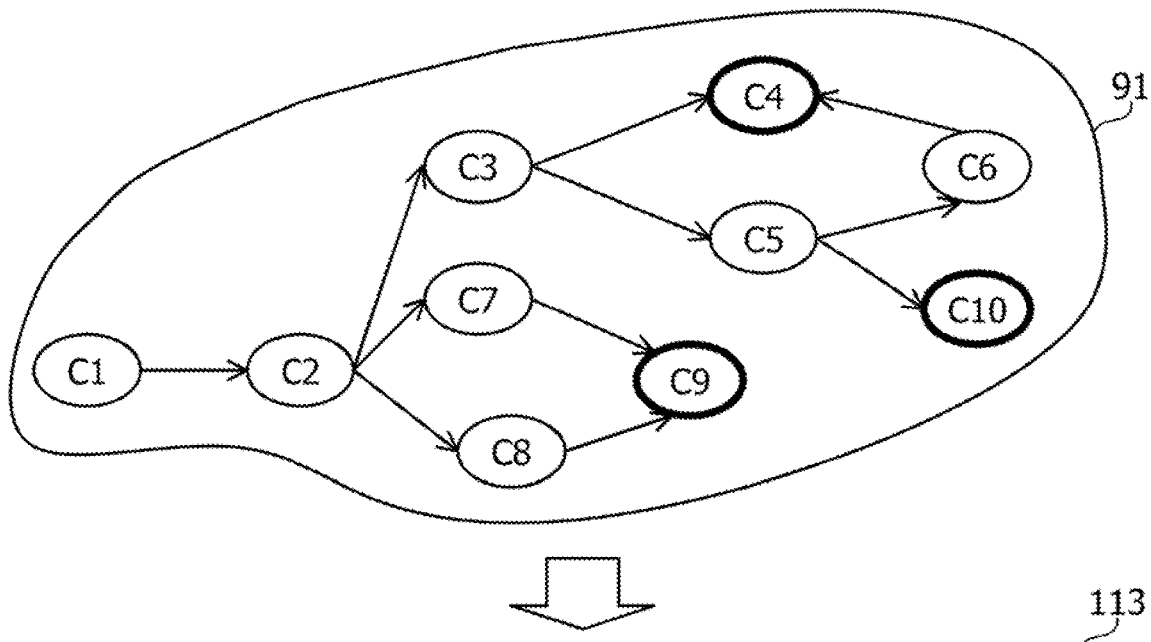
FIG. 17 is a diagram illustrating an example of a branch table.

FIG. 17 is a diagram illustrating an example of the branch table.

A branch table 113 is an example of the branch information. The branch table 113 is generated by the branch calculation unit 140 and is stored in the storage unit 110.

The branch table 113 includes items of a cluster, a branch ID, a belonging node, an end point node, and a nodal node. In the item of the cluster, a cluster number is registered. In the item of the branch ID, a branch ID that is identification information of a branch is registered. In the item of the belonging node, a node that belongs to the branch, in other words, for example, an ID of a container is registered. In the item of the end point node, an ID of a container corresponding to an end point node of the branch is registered. In the item of the nodal node, an ID of a container corresponding to a nodal node of the branch is registered.

In the following description, for example, a branch having a branch ID "br1" may be expressed as a "branch br1".

For example, in the branch table 113, records of the following branches br1 to br10 that belong to the cluster 91 having the cluster number "1" are recorded. Here, the containers that belong to the branch are described in an order from the end point node toward the nodal node.

The branch br1 Includes the containers C4 and C3. An end point node of the branch br1 is the container C4. A nodal node of the branch br1 is the container C3.

The branch br2 includes the containers C4, C6, and C5. An end point node of the branch br2 is the container C4. A nodal node of the branch br2 is the container C5.

The branch br3 includes the containers C4, C6, C5, and C3. An end point node of the branch br3 is the container C4. A nodal node of the branch br3 is the container C3.

The branch br4 includes the containers C4, C3, and C2. An end point node of the branch br4 is the container C4. A nodal node of the branch br4 is the container C2.

The branch br5 includes the containers C4, C6, C5, C3, and C2. An end point node of the branch br5 is the container C4. A nodal node of the branch br5 is the container C2.

The branch br6 includes the containers C9, C7, and C2. An end point node of the branch br6 is the container C9. A nodal node of the branch br6 is the container C2.

The branch br7 includes the containers C9, C8, and C2. An end point node of the branch br7 is the container C9. A nodal node of the branch br7 is the container C2.

The branch br8 Includes the containers C10 and C5. An end point node of the branch br8 is the container C10. A nodal node of the branch br8 is the container C5.

The branch br9 includes the containers C10, C5, and C3. An end point node of the branch br9 is the container C10. A nodal node of the branch br9 is the container C3.

The branch br10 includes the containers C10, C5, C3, and C2. An end point node of the branch br10 is the container C10. A nodal node of the branch br10 is the container C2.

Here, the branch calculation unit 140 calculates a branch that belongs to the duster 91 as follows.

First, the branch calculation unit 140 sets a container that does not call another container in the duster 91 as an end point node. In the example of the duster 91, the containers C4, C9, and C10 are the end point nodes.

Next, the branch calculation unit 140 traces the calling relationship from the end point node to the start point node (in other words, for example, container C1) and sets the traced portion to a branched node (in other words, for example, nodal node) as a single branch. For example, when tracing is performed from the container C4 to the container C1 through the container C3, the container C3 is a first nodal node. Therefore, a first branch is the branch br1 formed by the containers C4 and C3.

Furthermore, the branch calculation unit 140 further traces the nodes from the first nodal node calculated in the first branch to the start point and sets the traced portion to the next nodal node as a second branch. For example, in a case where the containers C4 and C3 form the first branch, a caller is traced from the container C4 again, and a caller ahead of the first nodal node C3 is traced. Because the next nodal node is the container C2, the second branch is the branch br4 formed by the containers C4, C3, and C2.

Then, by repeatedly executing the above procedure until a nodal node is no longer calculated for all the end point nodes, the branch calculation unit 140 creates the branches br1 to br10 for the duster 91.

In the branch table 113, a record of a branch that belongs to the duster 92 that has the duster number "2" is similarly recorded.

Figure 18:
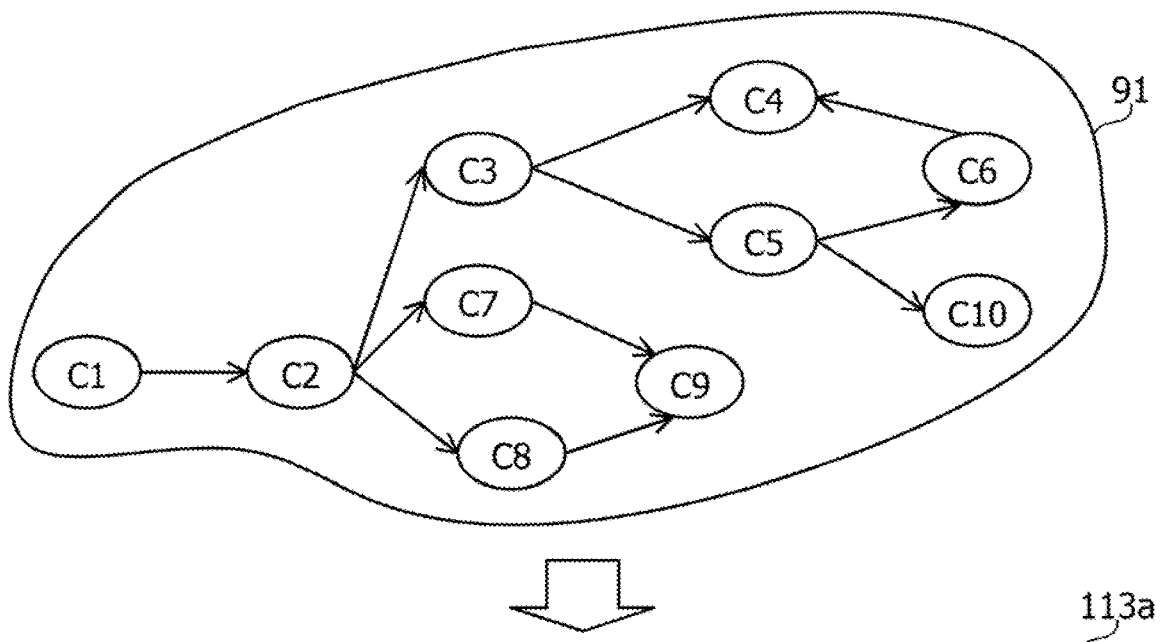
FIG. 18 is a diagram illustrating an example of calculating the number of edges.

FIG. 18 is a diagram illustrating an example of calculating the number of edges.

A branch table 113a is different from the branch table 113 in that an item of the number of edges is added. The edge number calculation unit 150 calculates the number of edges of each branch on the basis of the number of nodes that belong to each branch and records the calculated number in the branch table 113a. Specifically, for example, the number of edges of each branch is a number obtained by subtracting one from the number of nodes that belong to the branch. For example, because the number of the nodes that belong to the branch br5 is five, the number of edges is calculated as 5-1=4. The edge number calculation unit 150 similarly calculates the number of edges of other branches and records the calculated number in the branch table 113a.

Figure 19:
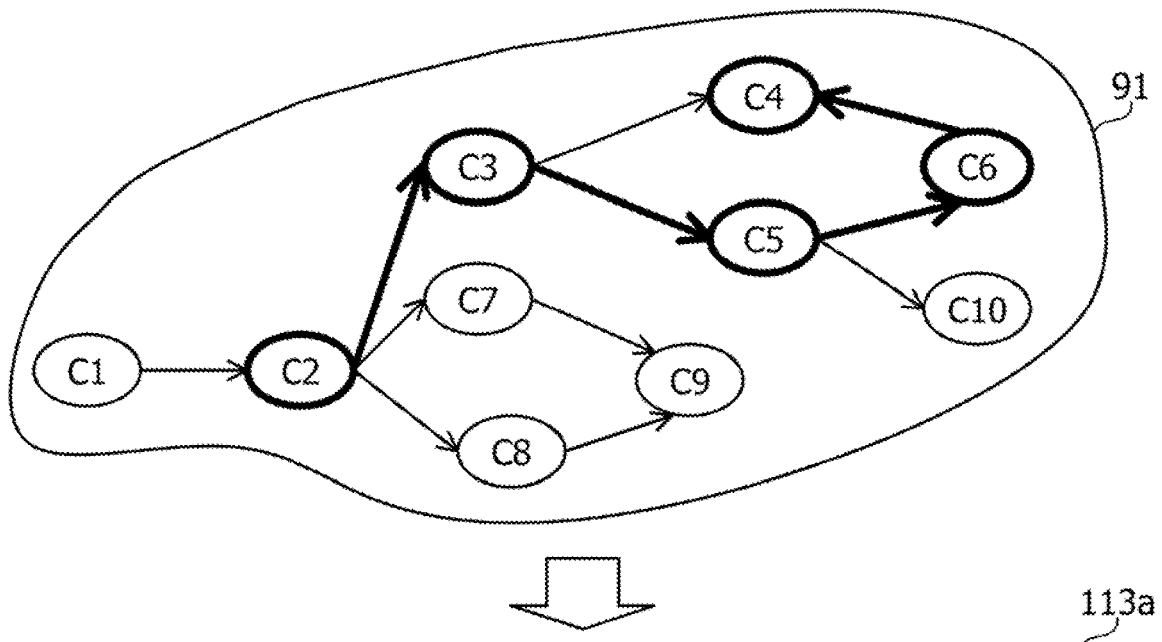
FIG. 19 is a diagram illustrating an example of extracting a moving candidate.

FIG. 19 is a diagram illustrating an example of extracting a moving candidate.

The moving container determination unit 170 determines a moving candidate branch for each duster on the basis of the branch table 113a.

The moving container determination unit 170 excludes a nodal node from the moving targets among the moving candidate branches. For example, in a case where the branch br6 is set as a moving candidate, the containers C9 and C7 other than the container C2 that is a nodal node are moving targets, and the container C2 is not set as a moving target. The container corresponding to the nodal node communicates with a relatively large number of containers. Therefore, by excluding the container corresponding to the nodal node from the moving targets, an increase in the frequency of the communication between the servers associated with the cooperation between the containers after being moved can be suppressed.

Furthermore, the moving container determination unit 170 does not select a branch that has the largest number of edges in the duster as a moving candidate. In the example of the duster 91, the branch br5 that has the largest number of edges is excluded from the moving candidate. By excluding the branch that has the largest number of edges from the moving candidate, the increase in the frequency of the communication between the servers associated with the cooperation between the containers after being moved is suppressed.

Furthermore, the moving container determination unit 170 does not select a branch that includes a node included in the branch that has the largest number of edges as a moving candidate. However, because the nodal node is not a moving target, the criterion that the branch including the node included in the branch that has the largest number of edges is not selected as a moving candidate is applied for determination on nodes other than the nodal node.

In the example of the duster 91, the nodes that belong to the branch br5 that has the largest number of edges are the containers C4, C6, C5, C3, and C2. Therefore, the moving container determination unit 170 extracts a branch that does not include the containers C4, C6, C5, C3, and C2 in the nodes other than the nodal node. For example, regarding the branch br8, the belonging node is the container C10, except for the container C5 that is a nodal node. The container C10 is not included in the containers C4, C6, C5, C3, and C2 of the branch br5. Therefore, the branch br8 is set as a moving candidate.

On the other hand, regarding the branch br9, the belonging nodes are the containers C10 and C5, except for the container C3 that is a nodal node. The container C5 is included in the containers C4, C6, C5, C3, and C2 of the branch br5. Therefore, the branch br9 is not set as a moving candidate.

As described above, the moving container determination unit 170 determines a branch that is not excluded from the moving candidates as a moving candidate branch. In the example of the duster 91, the moving container determination unit 170 determines the branches br6, br7, and br8 as the moving candidate branches.

Figure 20:
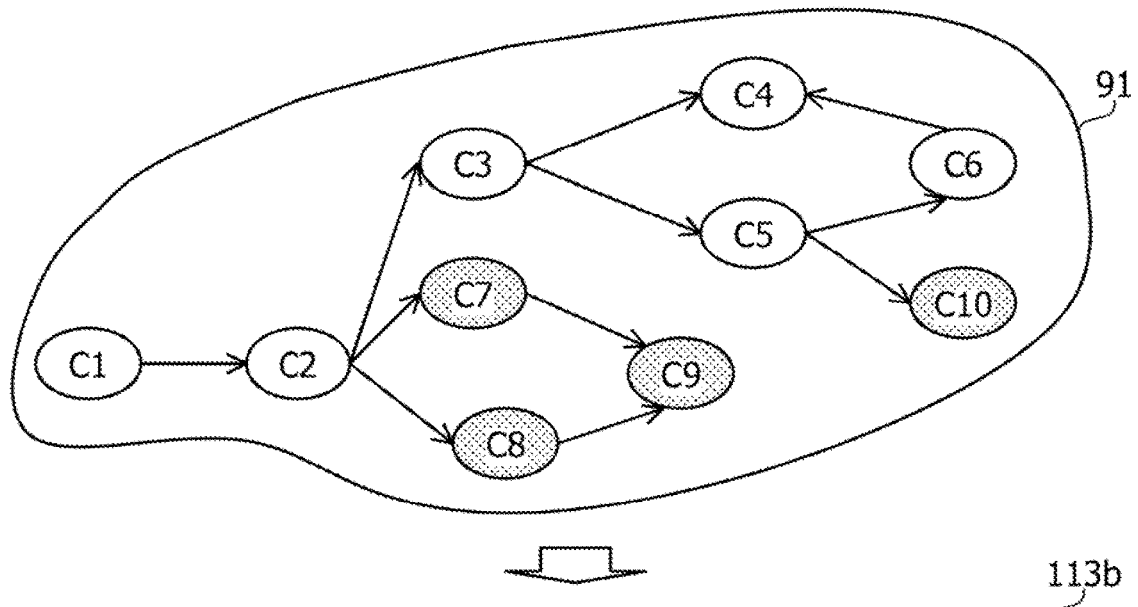
FIG. 20 is a diagram illustrating an example of deciding a moving priority.

FIG. 20 is a diagram illustrating an example of deciding a moving priority.

A branch table 113b is different from the branch table 113a in that an item of the moving priority is included. The moving container determination unit 170 calculates a moving priority of the moving candidate branch and records the moving priority in the branch table 113b.

However, all the moving candidate branches may be set as moving targets. In a case where all the moving candidate branches are set as the moving targets, the moving container determination unit 170 does not need to calculate the moving priority.

For example, by determining the moving priorities of the moving candidate branches, the branches can be moved in a decreasing order of the moving priority from the branch that has the highest moving priority among the moving candidate branches according to the load of the server or the like. For example, the moving container determination unit 170 calculates the moving priority as follows.

The moving container determination unit 170 raises the moving priority of the moving candidate branch as the number of edges is smaller among the moving candidate branches. For example, a branch that has the smallest number of edges among the moving candidate branches br6, br7, and br8 is the branch br8. Therefore, the branch br8 among the branches br6, br7, and br8 has the highest moving priority. Here, regarding the moving priority, "1" is the highest priority, and the priority decreases as the moving priority increases.

Furthermore, the moving container determination unit 170 sets the same moving priority to the moving candidate branches that have the container corresponding to the nodal node in common. For example, in both of the branches br6 and br7, the nodal node is the container C2. In this case, the moving container determination unit 170 sets the same moving priority to the branches br6 and br7. For example, because the branch br8 has the moving priority "1" among the branches br6, br7, and br8, the moving priority of the branches br6 and br7 is "2". It is preferable that the containers other than the nodal node that belong to the branches br6 and br7 having the same moving priority be collectively moved to the same server. This is because it is highly possible to suppress the frequency of the communication between the servers due to the cooperation between the containers to be low when the number of servers where the container that belongs to the duster 91 is arranged is as smaller as possible.

FIG. 21 is a diagram illustrating an example of a moving candidate branch table.

A moving candidate branch table 114 is an example of the moving candidate branch information. The moving candidate branch table 114 is generated by the moving container determination unit 170 and is stored in the storage unit 110.

The moving candidate branch table 114 includes items of a duster, a branch ID, a belonging node, a moving target node, and a moving priority. In the item of the cluster, a duster number is registered. In the item of the branch ID, a branch ID of a moving candidate branch is registered. In the item of the belonging node, an ID of a container that belongs to the branch is registered. In the item of the moving target node, an ID of a container to be moved from among containers included in the moving candidate branch is registered. In the item of the moving priority, a moving priority of the moving candidate branch is registered.

For example, in the moving candidate branch table 114, a record having a duster "1", a branch ID "br6", a belonging node "C9, C7, C2", a moving target node "C9, C7", and a moving priority "2" is registered. This record indicates that the branch br6 of the duster 91 having the duster number "1" is the moving candidate branch and the moving priority of the branch br6 is "2". Furthermore, this record indicates that the containers C9 and C7 among the containers C9, C7, and C2 that belong to the branch br6 are the moving target containers.

In the moving candidate branch table 114, similar records for the other moving candidate branches are registered.

The moving container decision unit 180 executes processing for deciding the moving container on the basis of the moving candidate branch table 114. Next, a procedure for deciding the moving container by the moving container decision unit 180 will be described.

Figure 22:
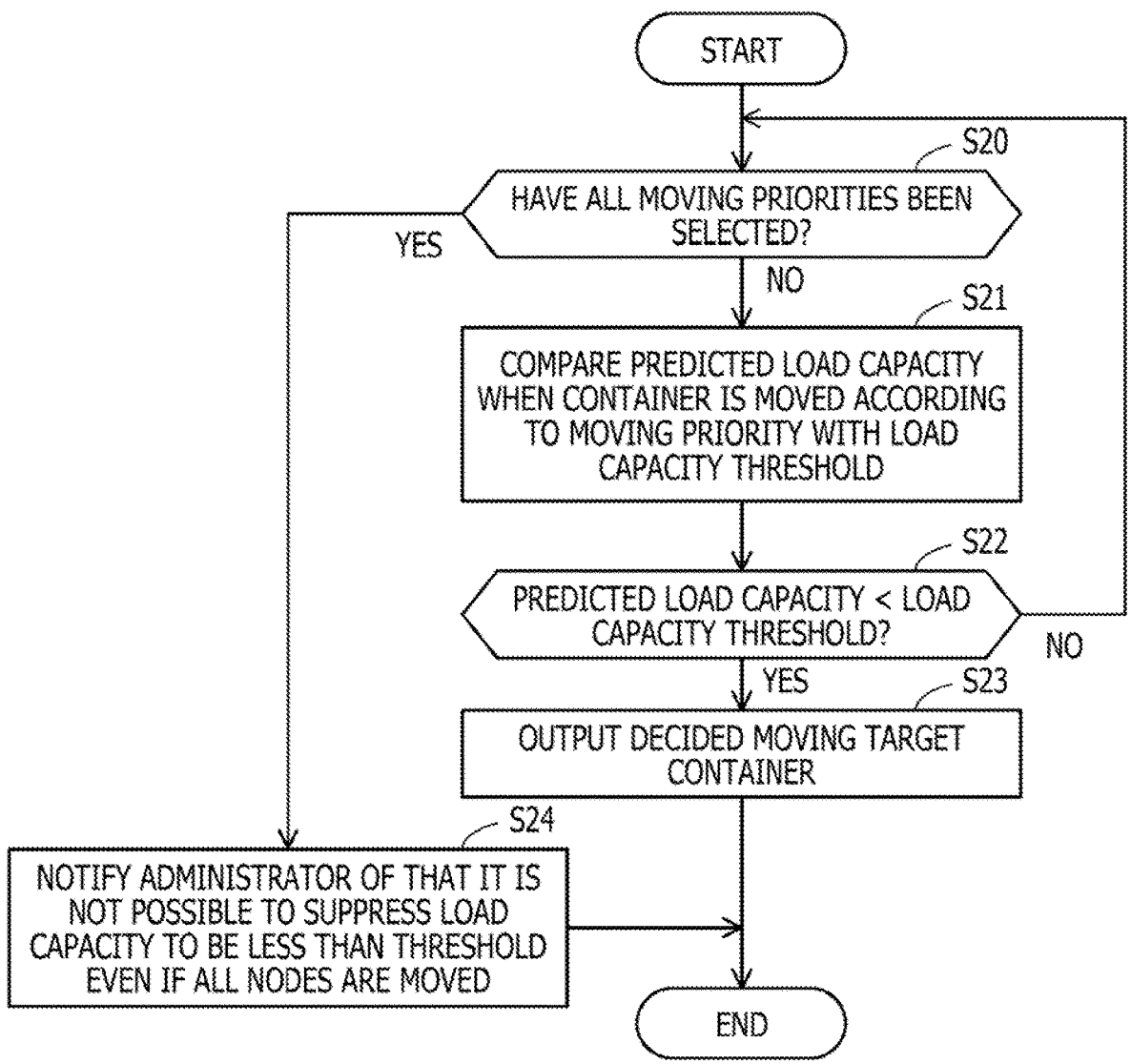
FIG. 22 is a flowchart illustrating an example of deciding a moving container.

FIG. 22 is a flowchart illustrating an example of deciding the moving container.

The processing for deciding the moving container corresponds to step S18. The following procedure is executed on the duster on the server of which the current load capacity is determined to be larger than the load capacity threshold in step S17. In a case where there is a plurality of servers of which the current load capacity is determined to be larger than the load capacity threshold, the procedure is executed for each server. The duster of the server is determined on the basis of the system configuration information acquired by the configuration information acquisition unit 160.

(S20) The moving container decision unit 180 determines whether or not all the moving priorities registered in the moving candidate branch information, in other words, for example, the moving candidate branch table 114 have been already selected. In a case where all the moving priorities have not been selected yet, the moving container decision unit 180 selects the highest moving priority among the unselected moving priorities and proceeds the processing to step S21. In a case where all the moving priorities have been selected, the moving container decision unit 180 proceeds the processing to step S24.

(S21) The moving container decision unit 180 compares a predicted load capacity when the containers are moved according to the moving priority with the load capacity threshold regarding the server. In order to obtain the predicted load capacity of the server, the moving container decision unit 180 acquires the moving target nodes corresponding to the moving priorities from the highest moving priority to the moving priority that is selected this time from the moving candidate branch table 114. Then, the moving container decision unit 180 obtains a predicted load capacity of the server after containers corresponding to the acquired moving target nodes are moved from the server. In a case where the container is moved from the server, a resource amount corresponding to the needed resource amount of the container is released in the server. Therefore, the moving container decision unit 180 obtains the predicted load capacity of the server when the container is moved by subtracting the needed resource amount of the moving target container from the current load capacity of the server. The needed resource amount for each container and the load capacity threshold for each server are stored in the storage unit 110 in advance. Note that, as in a case of the moving priority "2" in the moving candidate branch table 114, there is a case where there is the plurality of moving candidate branches such as the branch br6 including the containers C9 and C7 and the branch br7 including the containers C9 and C8. In this case, the moving target nodes for the moving priority "2" are the containers C9, C8, and C7.

(S22) The moving container decision unit 180 determines whether or not the predicted load capacity is smaller than the load capacity threshold. In a case where the predicted load capacity is smaller than the load capacity threshold, the moving container decision unit 180 proceeds the processing to step S23. In a case where the predicted load capacity is equal to or more than the load capacity threshold, the moving container decision unit 180 proceeds the processing to step S20.

(S23) The moving container decision unit 180 outputs the decided moving target container. In other words, for example, the moving container decision unit 180 outputs IDs of all the containers corresponding to the moving target nodes of the moving candidate branches from the branch having the highest moving priority to the branch having the moving priority selected this time in the duster on the server as moving target containers. Then, the moving container decision unit 180 ends the moving container decision.

(S24) The moving container decision unit 180 notifies an administrator of that it is not possible to suppress the load capacity of the server to be less than the load capacity threshold even if all the moving target nodes in the moving candidate branch are moved, regarding the server. Then, the moving container decision unit 180 ends the moving container decision.

In this way, the moving container decision unit 180 selects the branches to be moved from the branch having the first moving priority and selects the branch to be moved until the load of the server sufficiently falls. In the example of the moving candidate branch table 114, first, the moving container decision unit 180 decides the branch br8 that has the moving priority "1" as a moving target. In a case where the predicted load of the server 200 does not fall below the threshold by moving only the branch br8, the moving container decision unit 180 sets the branches br6 and br7 that have the moving priority "2" as the moving targets.

Note that, although the branches are moved in order from the branch that has the first moving priority, the moving container decision unit 180 may move a branch that has a lower priority first depending on the load of the server. For example, in a case where the branch that has a lower moving priority is moved rather than a case where the branch that has a higher moving priority is moved, there is a case where the load of the server can be decreased below the load capacity threshold and the number of moving target containers is smaller. In that case, the moving container decision unit 180 may preferentially set the branch that has the lower moving priority as a moving target rather than the branch that has the higher moving priority. In the example of the moving candidate branch table 114, a case is considered where the predicted load of the server 200 does not fall below the threshold even if only the branch br8 that has the moving priority "1" is moved and the predicted load of the server 200 falls below the threshold by moving only the branches br6 and br7 that have the moving priority "2". In that case, the moving container decision unit 180 may move the branches br6 and br7 without moving the branch br8.

Furthermore, a case is considered where the server to be processed includes the plurality of dusters. In that case, it is considered that the moving container decision unit 180 executes the above procedure for deciding the moving container, for example, in an order of the duster number or the like. For example, in a case where it is not possible to decrease the load capacity of the server below the load capacity threshold by moving only the containers with respect to the first cluster, the moving container decision unit 180 may perform control to move containers with respect to the second duster.

Next, an example of the system configuration information acquired by the configuration information acquisition unit 160 will be described. For example, the system configuration information includes a device information table and a connection information table described below.

FIG. 23 is a diagram illustrating an example of the device information table.

A device information table 115 is acquired by the configuration information acquisition unit 160 and is stored in the storage unit 110. The device information table 115 includes items of a device name, an ID, and a device type.

In the item of the device name, a name of a device is registered. Here, the device includes a container, a virtual machine, a server that is a physical machine, and relay devices such as a switch or a router. In the item of the ID, an ID of the device is registered. In the item of the device type, a type of the device is registered.

For example, in the device information table 115, a record that has a device name "container1", an ID "C1", and a device type "container" is registered. The record is a record for the container C1.

Furthermore, in the device information table 115, a record that has a device name "VM11", an ID "V1", and a device type "VM" is registered. The record is a record for the virtual machine 210 having the ID "V1".

Furthermore, in the device information table 115, a record that has a device name "server21", an ID "S1", and a device type "physical server" is registered. The record is a record for the server 200 having the ID "S1".

Furthermore, in the device information table 115, a record that has a device name "switch1", an ID "SW1", and a device type "physical switch" is registered. The record is a record for the switch 52 having the ID "SW1".

Furthermore, in the device information table 115, a record that has a device name "Router", an ID "R1", and a device type "physical router" is registered. The record is a record for the router 51 having the ID "R1".

In the device information table 115, records of other devices in the information processing system are similarly registered.

Figure 24:
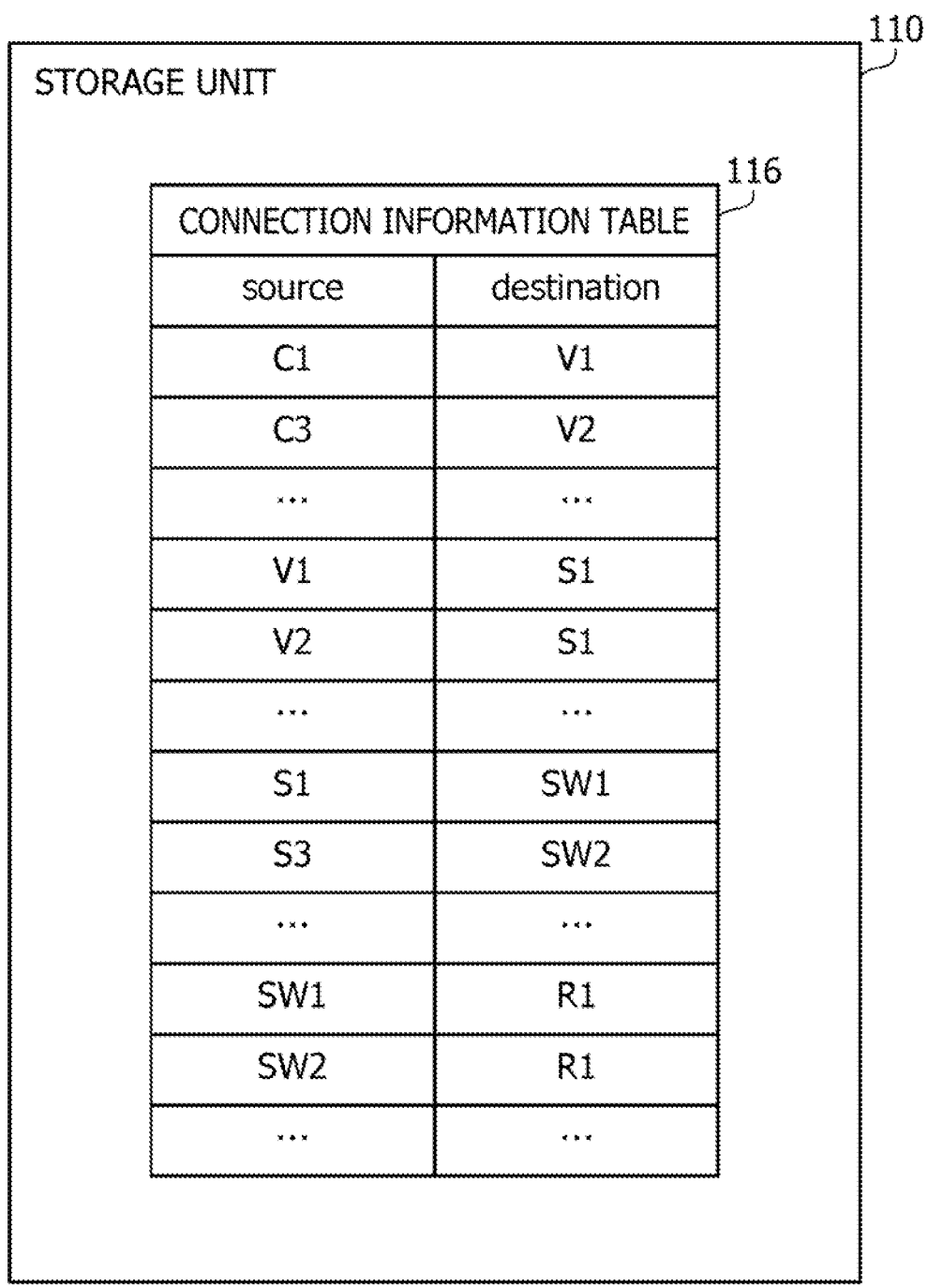
FIG. 24 is a diagram illustrating an example of a connection information table.

FIG. 24 is a diagram illustrating an example of the connection information table.

A connection information table 116 is acquired by the configuration information acquisition unit 160 and is stored in the storage unit 110. The connection information table 116 includes items of source and destination.

In the item of source, an ID of a connection source device is registered. In the item of destination, an ID of a connection destination device to which the connection source device is connected is registered. Here, there is a case where an expression "connect" is used for convenience regarding the virtual machines and the containers. For example, "to connect" a virtual machine to a physical machine means that the virtual machine operates on the physical machine. Furthermore, "to connect" a container to a virtual machine means that the container operates on the virtual machine.

For example, in the connection information table 116, a record that has a source "C1" and a destination "V1" is registered. This record indicates that the container C1 operates on the virtual machine 210.

Furthermore, in the connection information table 116, a record that has a source "V1" and a destination "S1" is registered. This record indicates that the virtual machine 210 operates on the server 200.

Furthermore, in the connection information table 116, a record that has a source "S1" and a destination "SW1" is registered. This record indicates that the server 200 is connected to the switch 52.

Furthermore, in the connection information table 116, a record that has a source "SW1" and a destination "R1" is registered. This record indicates that the switch 52 is connected to the router 51.

In the connection information table 116, a connection relationship between other devices in the information processing system is similarly registered.

The moving container decision unit 180 determines a container that is executed on the server of which the current load capacity exceeds the load capacity threshold on the basis of the system configuration information including the device information table 115 and the connection information table 116. The moving container decision unit 180 specifies a duster number of a duster on the server by collating the ID of the container on the server with a node information table 111a and a topology information table 112a.

The moving container decision unit 180 outputs the ID of the moving target container decided in step S23 in FIG. 22 to the container moving unit 190 and instructs the container moving unit 190 to move the container. Next, an example of the movement of the container included in the duster 91 by the container moving unit 190 will be described.

Figure 25:
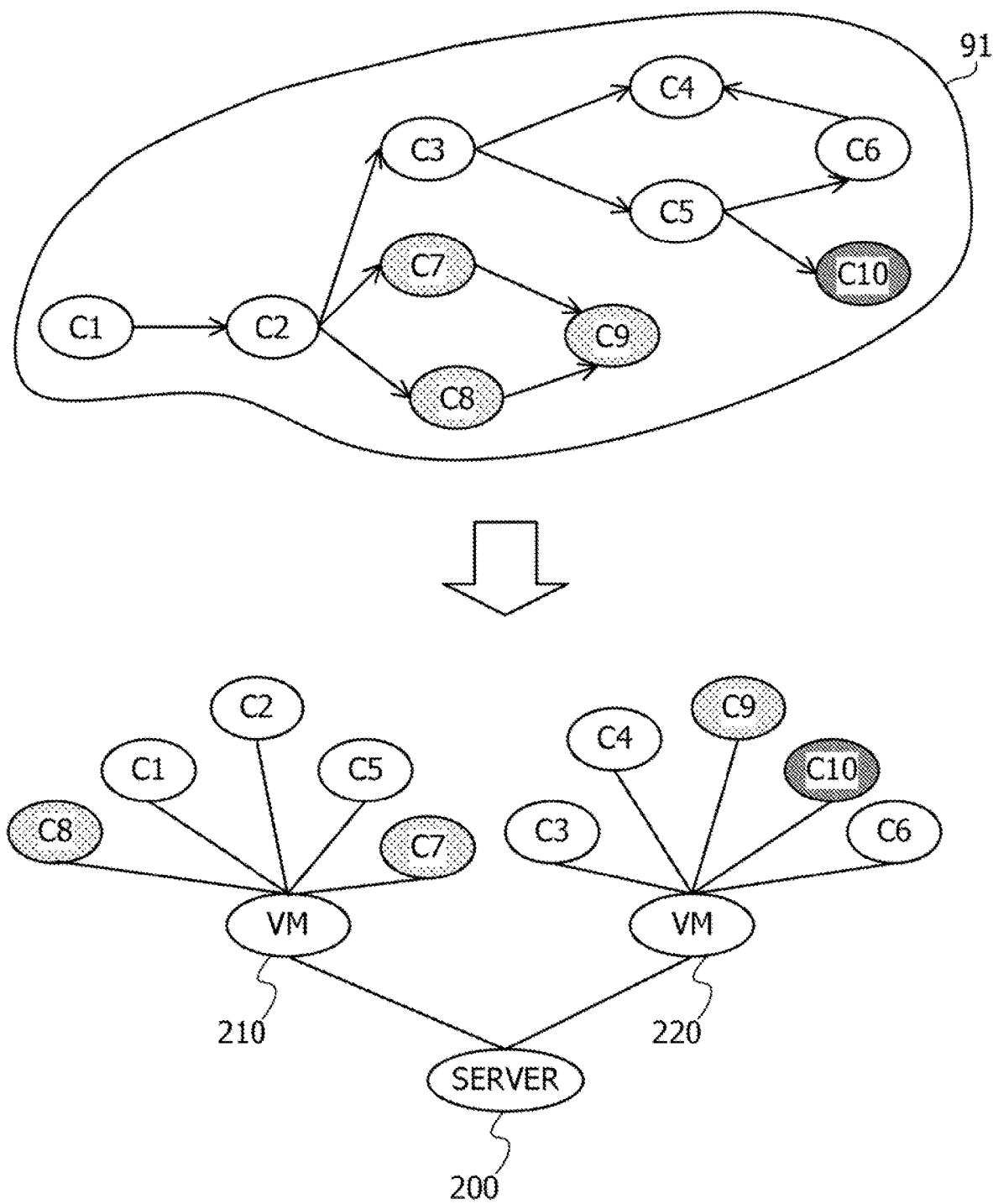
FIG. 25 is a diagram illustrating an example before the container is moved.

FIG. 25 is a diagram illustrating an example before the container is moved.

It is assumed that the moving container decision unit 180 instruct the container moving unit 190 that the containers C7, C8, C9, and C10 included in the moving candidate branches br6, br7, and br8 in the moving candidate branch table 114 in the duster 91 are the moving target containers. The moving container decision unit 180 notifies the container moving unit 190 of the containers C2 and C5 corresponding to the nodal nodes in the branches br6, br7, and br8.

The container moving unit 190 specifies that the containers C7 and C8 are executed on the virtual machine 210 that operates on the server 200 on the basis of the device information table 115 and the connection information table 116. Furthermore, the container moving unit 190 specifies that the containers C9 and C10 are executed on the virtual machine 220 that operates on the server 200 on the basis of the device information table 115 and the connection information table 116.

Figure 26:
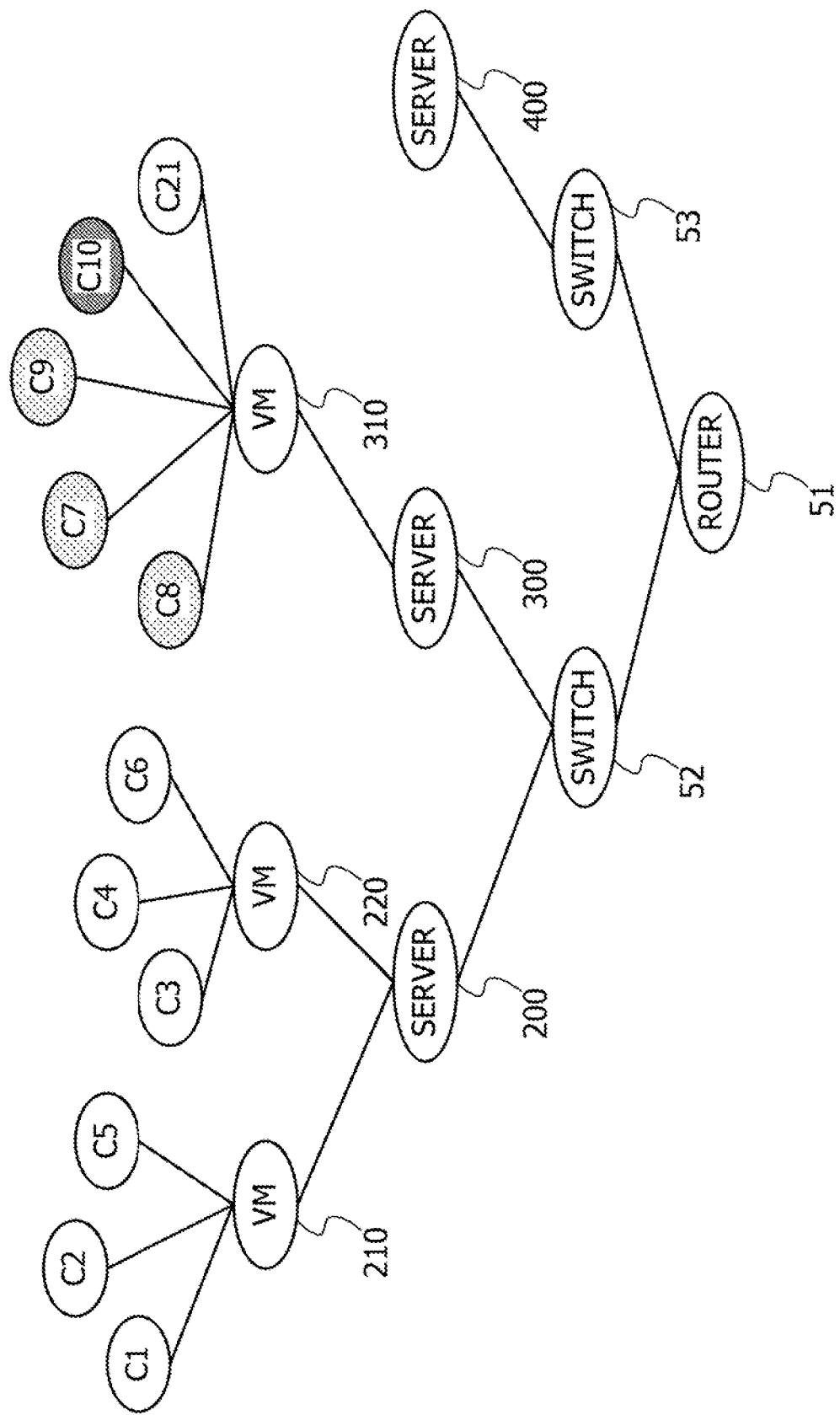
FIG. 26 is a diagram illustrating an example after the container has been moved.

FIG. 26 is a diagram illustrating an example after the container has been moved.

The container moving unit 190 decides moving destination servers of the containers C7 to C10 on the basis of the current load capacity and the load capacity threshold of each server, the device information table 115, and the connection information table 116. The container moving unit 190 selects a server of which the load capacity of the moving destination server does not exceed the load capacity threshold even if the container is moved as a moving destination server candidate.

For example, in a case where there is a plurality of moving destination server candidates, the container moving unit 190 preferentially selects a server that has fewer relay devices included in the communication path to the moving source server among the plurality of candidates as a moving destination server. For example, a case is considered where the servers 300 and 400 are set as moving destination candidates. In this case, the relay device included in the communication path to the server 200 for the server 300 is the switch 52. Three relay devices such as the switch 52, the router 51, and the switch 53 are included in the communication path to the server 200 for the server 400. Therefore, the container moving unit 190 prioritizes the server 300 than the server 400 as the moving destination of the containers C7 to C10. Furthermore, the container moving unit 190 sets the same moving destination server for the containers to be moved that belongs to the moving candidate branches having the same moving priority.

The container moving unit 190 decides the moving destination of the containers C7 to C10 to the virtual machine 310 of the server 300. Then, for example, the container moving unit 190 arranges images of the containers C7 to C10 in the server 300 and activates the containers C7 to C10 in the server 300. At the same time, the container moving unit 190 notifies the server 200 to change the communication destinations for the containers C7 and C8 by the container C2 to the server 300. Furthermore, the container moving unit 190 notifies the server 200 to change the communication destination for the container C10 by the container C5 to the virtual machine 310 of the server 300. Moreover, the container moving unit 190 stops the containers C7 to C10 on the server 200. As a result, the containers C7 to C10 are moved from the server 200 to the server 300. Furthermore, in the server 200, when the containers C7 to C10 are stopped, resources used for operations of the containers C7 to C10 are released. As a result, the load of the server 200 is offloaded to the server 300, and the load of the server 200 is reduced.

FIG. 26 illustrates a state after the moving target containers C7 to C10 have been moved from the server 200 to the server 300 in this way.

In this way, the management device 100 decides the moving candidates in branch units and collectively moves a container group that belongs to the decided moving candidate branch to another server so that an increase in the communication delay time due to the movement of the containers can be suppressed.

Note that, in the above example, the moving candidate branch is decided by the method illustrated in FIG. 19, and the moving priority is assigned. However, all the branches belonging to the duster (for example, duster 91) may be set as the moving candidates, and the moving priority may be assigned.

Therefore, in the following, as a modification of the second embodiment, an example will be described in which all the branches belonging to the duster 91 are set as the moving candidates and the moving priorities are assigned.

Figure 27:
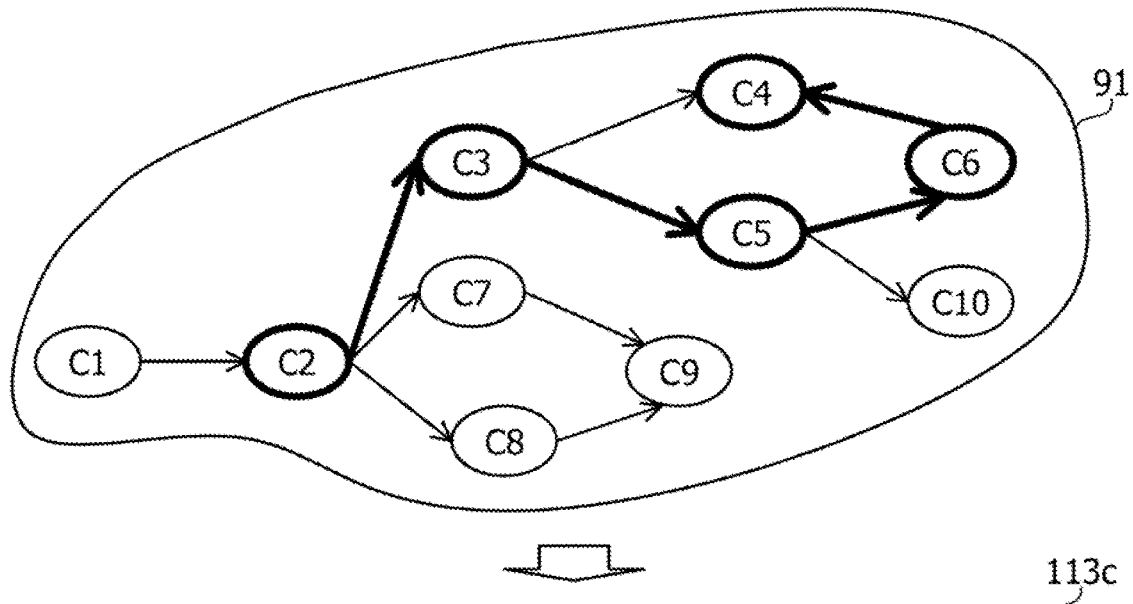
FIG. 27 is a diagram illustrating another example of deciding the moving priority.

FIG. 27 is a diagram illustrating another example of deciding the moving priority.

The moving container determination unit 170 generates a branch table 113c instead of the branch table 113b and stores the branch table 113c in the storage unit 110. The moving container determination unit 170 calculates a moving priority of the moving candidate branch and records the moving priority in the branch table 113c. As described above, the moving container determination unit 170 sets all the branches that belong to each duster as moving candidates.

First, according to the procedure illustrated in FIGS. 19 and 20, the moving container determination unit 170 sets the moving priority of the branch br8 to "1" and sets the moving priorities of the branches br6 and br7 to "2".

Then, the moving container determination unit 170 calculates the moving priorities of the remaining branches br1 to br5, br9, and br10 as follows.

The moving container determination unit 170 extracts a container group in an order from the end point node to the nodal node in the branch that has the largest number of edges and assigns a moving priority to the branch including the container group.

In the example of the duster 91, first, the moving container determination unit 170 extracts the container C4 that is the end point node of the branch br5 that has the largest number of edges. Then, the moving container determination unit 170 sets the highest moving priority "3" among the branches br1 to br5, br9, and br10 to the branch br1 that includes the container C4 and has the smallest number of edges.

Next, the moving container determination unit 170 extracts the containers C4 and C6 corresponding to the end point node of the branch br5 that has the largest number of edges and a node that is one level higher than the end point node. Then, the moving container determination unit 170 sets the highest moving priority "4" among the branches br2 to br5, br9, and br10 to the branch br2 that includes the containers C4 and C6 and has the smallest number of edges.

Thereafter, similarly, the moving container determination unit 170 assigns the moving priority to each branch. However, for other branches that include some containers of the extracted container group and has the extracted container group and the nodal node in common, the moving container determination unit 170 assigns the moving priority same as that of the branch that includes the entire extracted container group and has the smallest number of edges.

In the example of the duster 91, subsequent to the assignment of the moving priority "4", the moving container determination unit 170 extracts the containers C4, C6, and C5 by tracing the nodes from the end point node of the branch br5 that has the largest number of edges to the upper node in order. Then, the moving container determination unit 170 sets the highest moving priority "5" among the branches br3 to br5, br9, and br10 to the branch br3 that includes the containers C4, C6, and C5 and has the smallest number of edges. Here, the nodal node of the branch br3 is the container C3 that is the same as the nodal node of the branch br9. Furthermore, the branch br9 includes the container C5 that is a part of the containers C4, C6, and C5. Therefore, the moving container determination unit 170 sets the moving priority "5", same as that of the branch br3, to the branch br9.

Moreover, the moving container determination unit 170 extracts the containers C4, C6, C5, and C3 by tracing nodes from the end point node of the branch br5 that has the largest number of edges to the upper node in order. Then, the moving container determination unit 170 sets the highest moving priority "6" among the branches br4, br5, and br10 to the branch br5 that includes the containers C4, C6, C5, and C3 and has the smallest number of edges. Here, the nodal node of the branch br5 is the container C2 that is the same as the nodal node of the branches br4 and br10. Furthermore, the branch br4 includes the containers C4 and C3 that are part of the containers C4, C6, C5, and C3. Furthermore, the branch br10 includes the containers C5 and C3 that are part of the containers C4, C6, C5, and C3. Therefore, the moving container determination unit 170 sets the moving priority "6", same as that of the branch br5, to the branches br4 and br10.

FIG. 28 is a diagram illustrating another example of the moving candidate branch table.

A moving candidate branch table 114a is an example of the moving candidate branch information. The moving candidate branch table 114a is generated by the moving container determination unit 170 on the basis of the branch table 113c and is stored in the storage unit 110.

The moving candidate branch table 114a includes the items similar to those of the moving candidate branch table 114.

For example, in the moving candidate branch table 114a, a record that has a duster "1", a branch ID "br1", a belonging node "C4 and C3", a moving target node "C4", and a moving priority "3" is registered. This record indicates that the branch br1 of the duster 91 having the duster number "1" is the moving candidate branch and the moving priority of the branch br1 is "3". Furthermore, this record indicates that the container C4 among the containers C4 and C3 that belong to the branch br1 is a moving target container.

In the moving candidate branch table 114a, similar records for the other moving candidate branches are registered.

Next, a procedure for deciding the moving container on the basis of the moving candidate branch table 114a by the moving container decision unit 180 will be described. The following procedure is executed instead of the procedure in FIG. 22.

Figure 29:
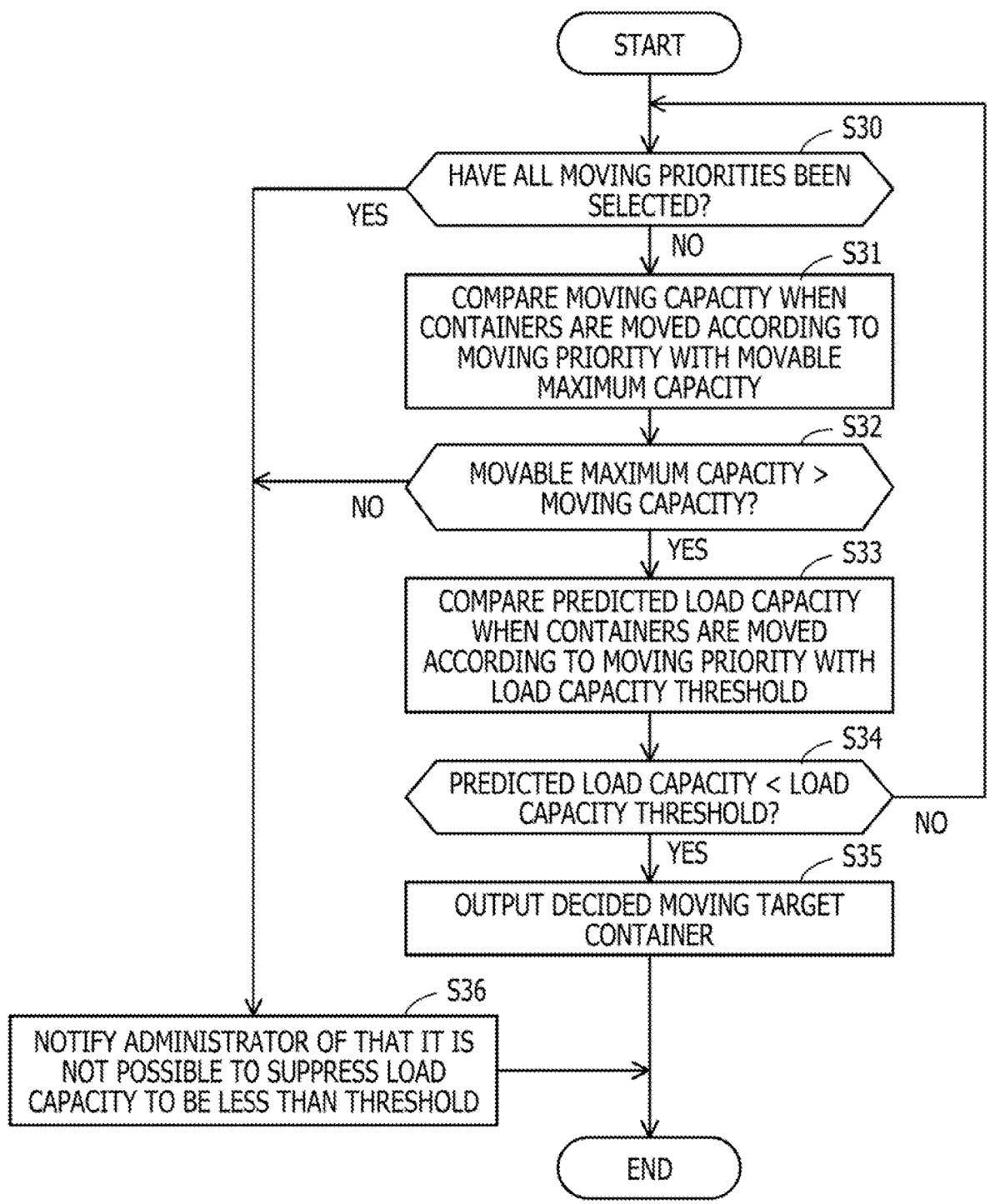
FIG. 29 is a flowchart illustrating another example of deciding the moving container.

FIG. 29 is a flowchart illustrating another example of deciding the moving container.

The processing for deciding the moving container corresponds to step S18. The following procedure is executed on the duster on the server of which the current load capacity is determined to be larger than the load capacity threshold in step S17. In a case where there is a plurality of servers of which the current load capacity is determined to be larger than the load capacity threshold, the procedure is executed for each server. The duster of the server is determined on the basis of the system configuration information acquired by the configuration information acquisition unit 160.

(S30) The moving container decision unit 180 determines whether or not all the moving priorities registered in the moving candidate branch information, in other words, for example, the moving candidate branch table 114a have been already selected. In a case where all the moving priorities have not been selected yet, the moving container decision unit 180 selects the highest moving priority from among the unselected moving priorities and proceeds the processing to step S31. In a case where all the moving priorities have been selected, the moving container decision unit 180 proceeds the processing to step S36.

(S31) The moving container decision unit 180 compares a moving capacity when the containers are moved according to the moving priority with a movable maximum capacity regarding the server. Here, the movable maximum capacity is a maximum value of a load capacity that is allowed to be moved for the server. The movable maximum capacity is stored in the storage unit 110 in advance for each server. Furthermore, the moving capacity is a load capacity that is moved as the containers are moved. The moving capacity corresponds to a value obtained by subtracting the predicted load capacity from the current load capacity of the server. Note that the movable maximum capacity may be determined as an upper limit value of the number of containers to be moved. In that case, the moving capacity is the number of containers to be moved.

(S32) The moving container decision unit 180 determines whether or not the movable maximum capacity is larger than the moving capacity regarding the server. In a case where the movable maximum capacity is larger than the moving capacity, the moving container decision unit 180 proceeds the processing to step S33. In a case where the movable maximum capacity is equal to or less than the moving capacity, the moving container decision unit 180 proceeds the processing to step S36.

(S33) The moving container decision unit 180 compares a predicted load capacity when the containers are moved according to the moving priority with the load capacity threshold regarding the server. A method for acquiring the predicted load capacity of the server is similar to step S21.

(S34) The moving container decision unit 180 determines whether or not the predicted load capacity is smaller than the load capacity threshold, regarding the server. In a case where the predicted load capacity is smaller than the load capacity threshold, the moving container decision unit 180 proceeds the processing to step S35. In a case where the predicted load capacity is equal to or more than the load capacity threshold, the moving container decision unit 180 proceeds the processing to step S30.

(S35) The moving container decision unit 180 outputs the decided moving target container. In other words, for example, the moving container decision unit 180 outputs IDs of all the containers corresponding to the moving target nodes of the moving candidate branches from the branch having the highest moving priority to the branch having the moving priority selected this time in the duster on the server as moving target containers. Then, the moving container decision unit 180 ends the moving container decision.

(S36) The moving container decision unit 180 notifies an administrator of that it is not possible to suppress the load capacity of the server to be less than the load capacity threshold even if all the moving target nodes in the moving candidate branch are moved in the server. Then, the moving container decision unit 180 ends the moving container decision.

In this way, the moving container decision unit 180 selects the branches to be moved from the branch having the first moving priority and selects the branch to be moved until the load of the server sufficiently falls. Note that, although the branches are moved in order from the branch that has the first moving priority, the moving container decision unit 180 may move a branch that has a lower priority first depending on the load of the server. For example, in a case where the branch that has a lower moving priority is moved rather than a case where the branch that has a higher moving priority is moved, there is a case where the load of the server can be decreased below the load capacity threshold and the number of moving target containers is smaller. In that case, the moving container decision unit 180 may preferentially set the branch that has the lower moving priority as a moving target rather than the branch that has the higher moving priority.

Furthermore, a case is considered where the server to be processed by the moving container decision unit 180 includes the plurality of dusters. In that case, it is considered that the moving container decision unit 180 executes the above procedure for deciding the moving container, for example, in an order of the duster number or the like. For example, in a case where it is not possible to decrease the load capacity of the server below the load capacity threshold by moving only the containers with respect to the first duster, the moving container decision unit 180 may perform control to move containers with respect to the second duster.

FIG. 30 is a diagram illustrating an example of a moving target branch table.

A moving target branch table 117 is generated by the moving container decision unit 180 on the basis of the moving candidate branch table 114a and is stored in the storage unit 110. For example, the moving container decision unit 180 outputs the moving target branch table 117 as the output in step S35.

The moving target branch table 117 includes items similar to those of the moving candidate branch tables 114 and 114a.

For example, in the moving target branch table 117, a record that has a cluster "1", a branch ID "br1", a belonging node "C4 and C3", a moving target node "C4", and a moving priority "3" is registered. This record indicates that the branch br1 of the duster 91 having the duster number "1" is the moving target branch and the moving priority of the branch br1 is "3". Furthermore, this record indicates that the container C4 among the containers C4 and C3 that belong to the branch br1 is a moving target container.

In the moving target branch table 117, similar records for the other moving target branches are registered. In the example of the moving target branch table 117, a case is illustrated where the branches br1 to br3 to br6 to br9 are selected from among the moving candidate branches in the moving candidate branch table 114a as the moving target branches. In this case, the moving target containers are the containers C4 to C10.

The container moving unit 190 moves the container included in each moving target branch from the server 200 to another server on the basis of the moving target branch table 117.

Figure 31:
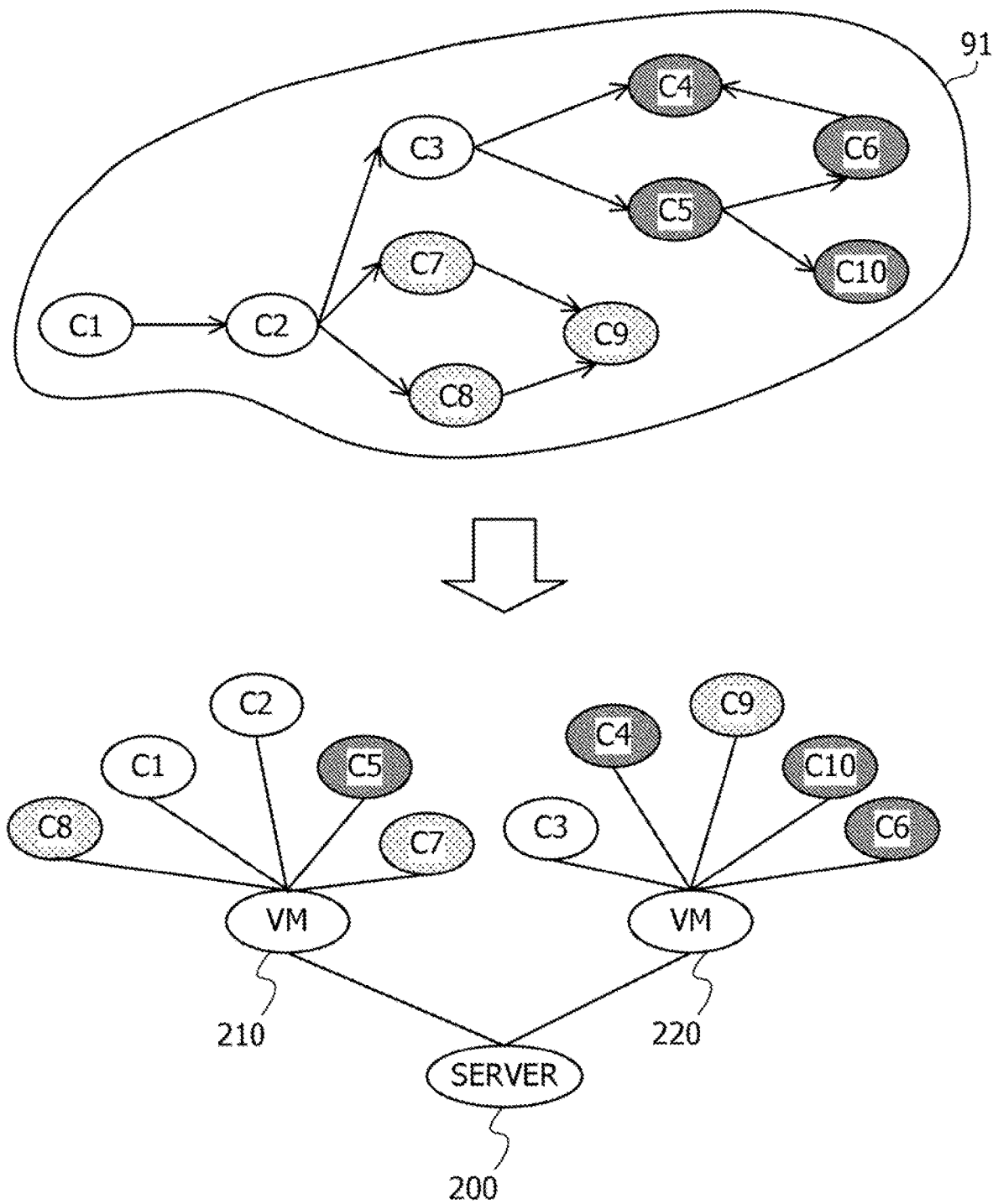
FIG. 31 is a diagram illustrating an example before the container is moved.

FIG. 31 is a diagram illustrating an example before the container is moved.

The container moving unit 190 specifies that the moving target containers C5, C7, and C8 are executed on the virtual machine 210 that operates on the server 200 on the basis of the device information table 115 and the connection information table 116. Furthermore, the container moving unit 190 specifies that the moving target containers C4, C6, C9, and C10 are executed on the virtual machine 220 that operates on the server 200 on the basis of the device information table 115 and the connection information table 116.

Figure 32:
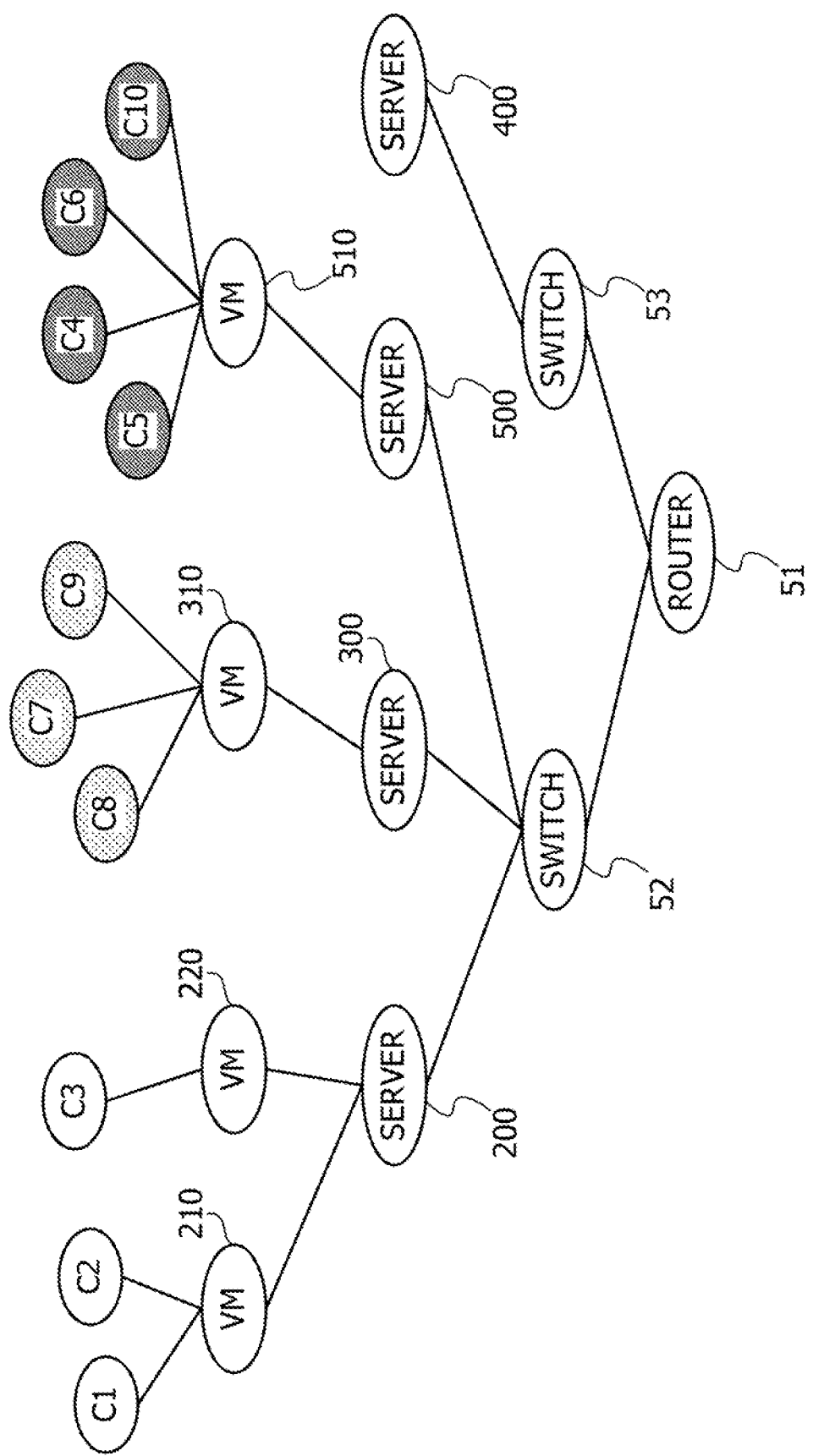
FIG. 32 is a diagram illustrating an example after the container has been moved.

FIG. 32 is a diagram illustrating an example after the container has been moved.

The container moving unit 190 decides a moving destination server of the containers C4 to C10 on the basis of the current load capacity and the load capacity threshold of each server, the device information table 115, and the connection information table 116. The container moving unit 190 selects a server of which the load capacity of the moving destination server does not exceed the load capacity threshold even if the container is moved as a moving destination server candidate.

For example, in a case where there is a plurality of moving destination server candidates, the container moving unit 190 preferentially selects a server that has fewer relay devices included in the communication path to the moving source server among the plurality of candidates as a moving destination server. For example, a case is considered where a server 500 connected to the servers 300 and 400 and the switch 52 is a moving candidate. In this case, the relay device included in the communication path to the server 200 for the servers 300 and 500 is the switch 52. Three relay devices including the switch 52, the router 51, and the switch 53 are included in the communication path to the server 200 for the server 400.

Therefore, the container moving unit 190 prioritizes the servers 300 and 500 than the server 400 as the moving destinations of the containers C4 to C10. Furthermore, the container moving unit 190 sets the same moving destination server for the containers to be moved that belongs to the moving candidate branches having the same moving priority. For example, the container moving unit 190 decides the moving destination of the containers C7, C8, and C9 included in the branches br6 and br7 having the moving priority "2" to the virtual machine 310 of the server 300. Furthermore, the container moving unit 190 decides the moving destination of the containers C4, C5, C6, and C10 included in the branches br3 and br9 having the moving priority "5" to the virtual machine 510 of the server 500.

The container moving unit 190 moves each container to the moving destination server by a method similar to the method illustrated in FIG. 26. As a result, the load of the server 200 is offloaded to the servers 300 and 500, and the load of the server 200 is reduced.

FIG. 32 illustrates a state after the moving target containers C7, C8, and C9 have been moved from the server 200 to the server 300 and the containers C4, C5, C6, and C10 have been moved from the server 200 to the server 500.

In this way, the management device 100 decides the moving candidates in branch units and collectively moves a container group that belongs to the decided moving candidate branch to another server so that an increase in the communication delay time due to the movement of the containers can be suppressed. Specific description is as follows.

Figure 33:
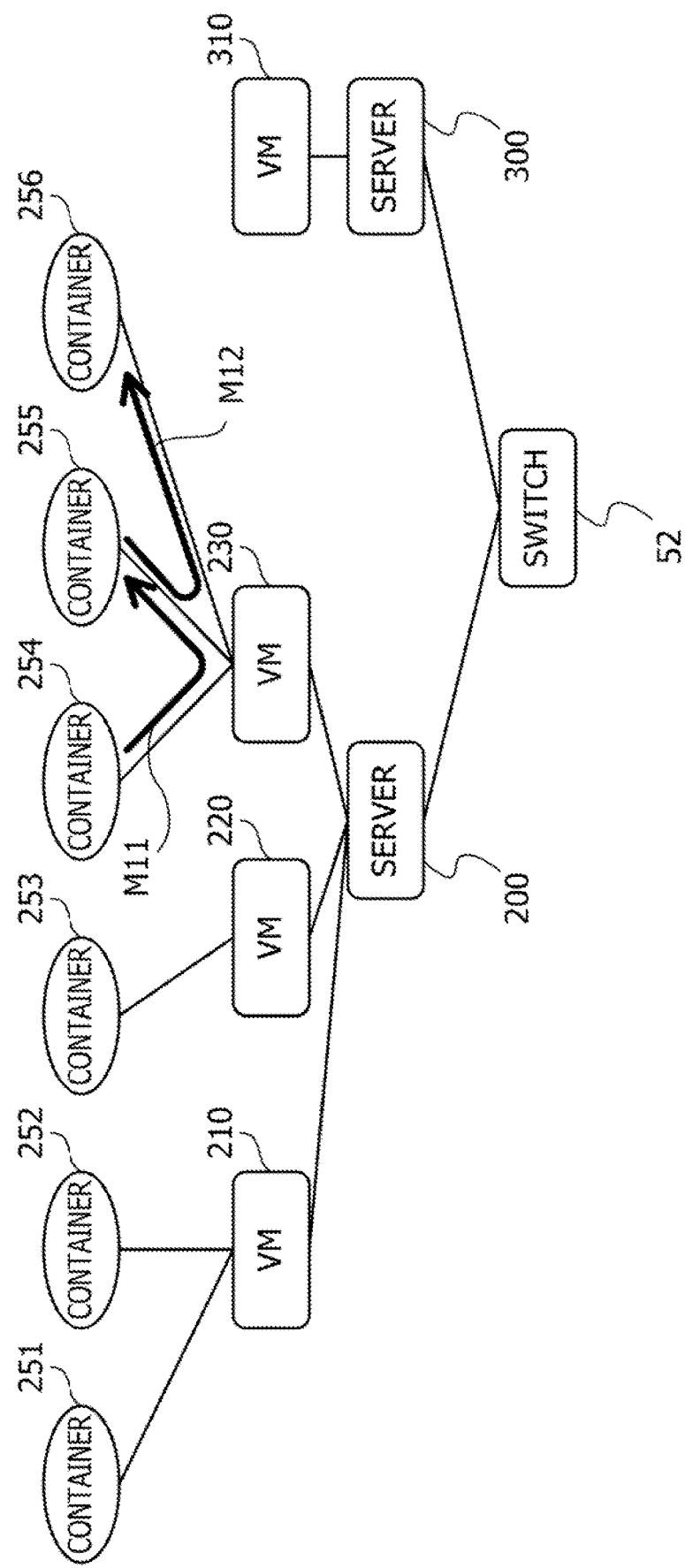
FIG. 33 is a diagram illustrating an example of the calling relationship between the containers.

FIG. 33 is a diagram illustrating an example of a calling relationship between the containers.

For example, a case is considered where containers 251 to 256 that belong to a single cluster are executed on the server 200. The containers 251 and 252 are executed by the virtual machine 210 on the server 200. The container 253 is executed by the virtual machine 220 on the server 200. The containers 254 to 256 are executed by a virtual machine 230 on the server 200.

The containers 254 to 256 are included in a single branch. However, none of the containers 254 to 256 are nodal nodes. The container 254 calls the container 255. A call M11 indicates a call of the container 255 by the container 254. The container 255 calls the container 256. A call M12 indicates a call of the container 256 by the container 255.

Figure 34A:
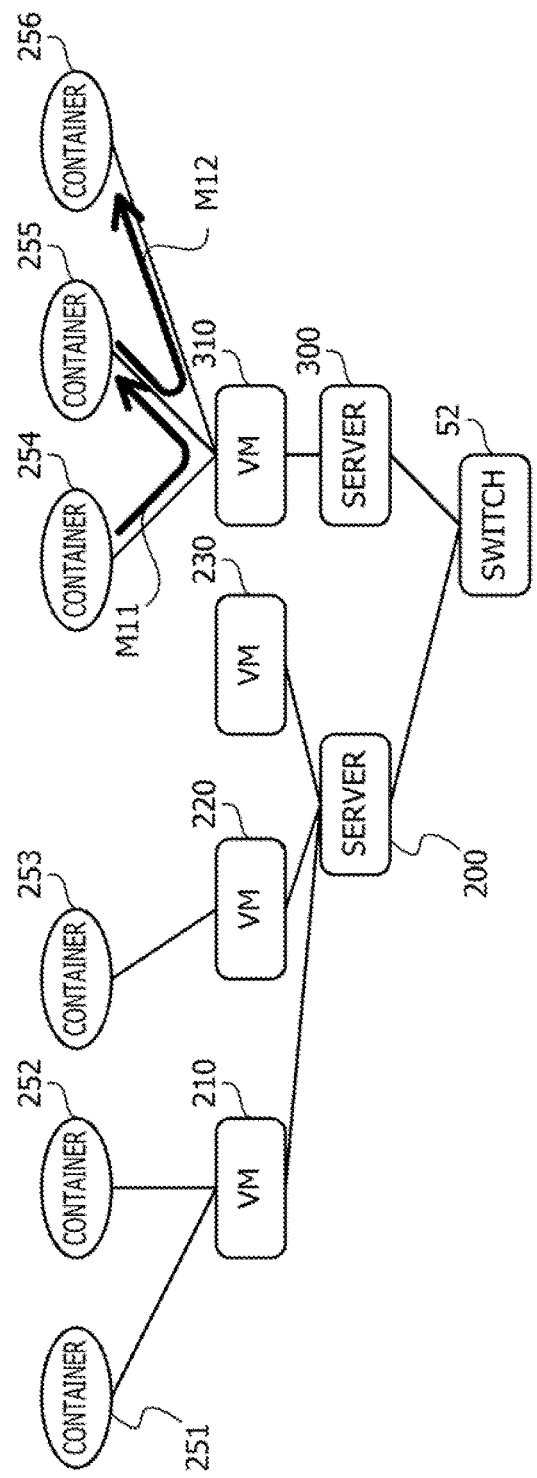
FIGS. 34A and 34B are diagrams illustrating a movement example and a comparative example in branch units.
Figure 34B:
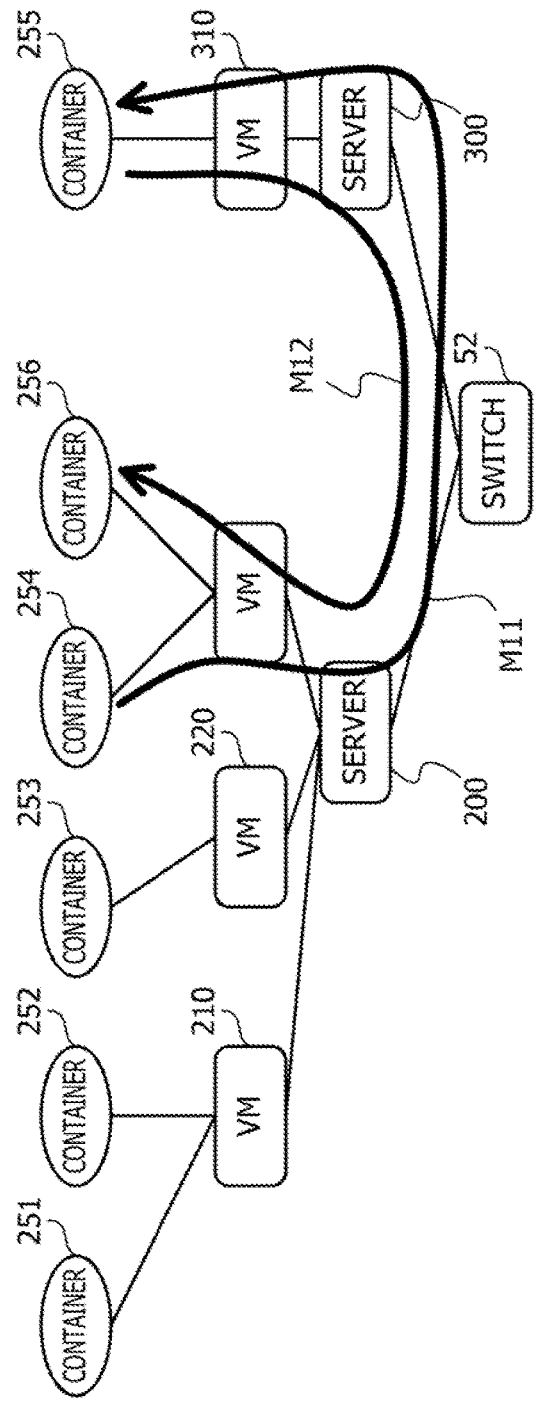

FIGS. 34A and 34B are diagrams illustrating a movement example and a comparative example in branch units.

FIG. 34A illustrates the movement example of the containers in branch units. For example, the management device 100 moves the containers 254 to 256 to the virtual machine 310 on the same server 300. Then, both of the calls M11 and M12 are executed in the server 300 and do not pass through the switch 52.

FIG. 34B illustrates the comparative example of the movement of the containers. In the comparative example, the containers are individually moved in container units. In the method of the comparative example, there is a case where the container 255 among the containers 254 to 256 is moved to the virtual machine 310 on the server 300 and the containers 254 and 256 remain in the server 200. In this case, both of the calls M11 and M12 pass through the switch 52. In other words, for example, return communication caused by the cooperation between the containers occurs between the servers 200 and 300. Then, a delay time caused by the return communication between the servers 200 and 300 due to the calls M11 and M12 is added to the response time of the service regarding the cooperation between the containers 254 to 256. Alternatively, for example, in a case where, although all the containers 254 to 256 are moved, at least one of the containers 254 to 256 is moved to a separate server, communication through the switch 52 occurs between some of the moved containers, and a response time deteriorates.

Therefore, as illustrated in FIG. 34A, by deciding the moving target container in branch units, the management device 100 suppresses the occurrence of the communication through the relay device such as the switch 52 between the moved containers. As a result, an increase in the communication delay time caused by the movement of the containers can be suppressed.

Furthermore, in a case where the plurality of moving candidate branches exists, the management device 100 preferentially selects a moving candidate branch that has fewer edges among the moving candidate branches as a moving target.

Figure 35:
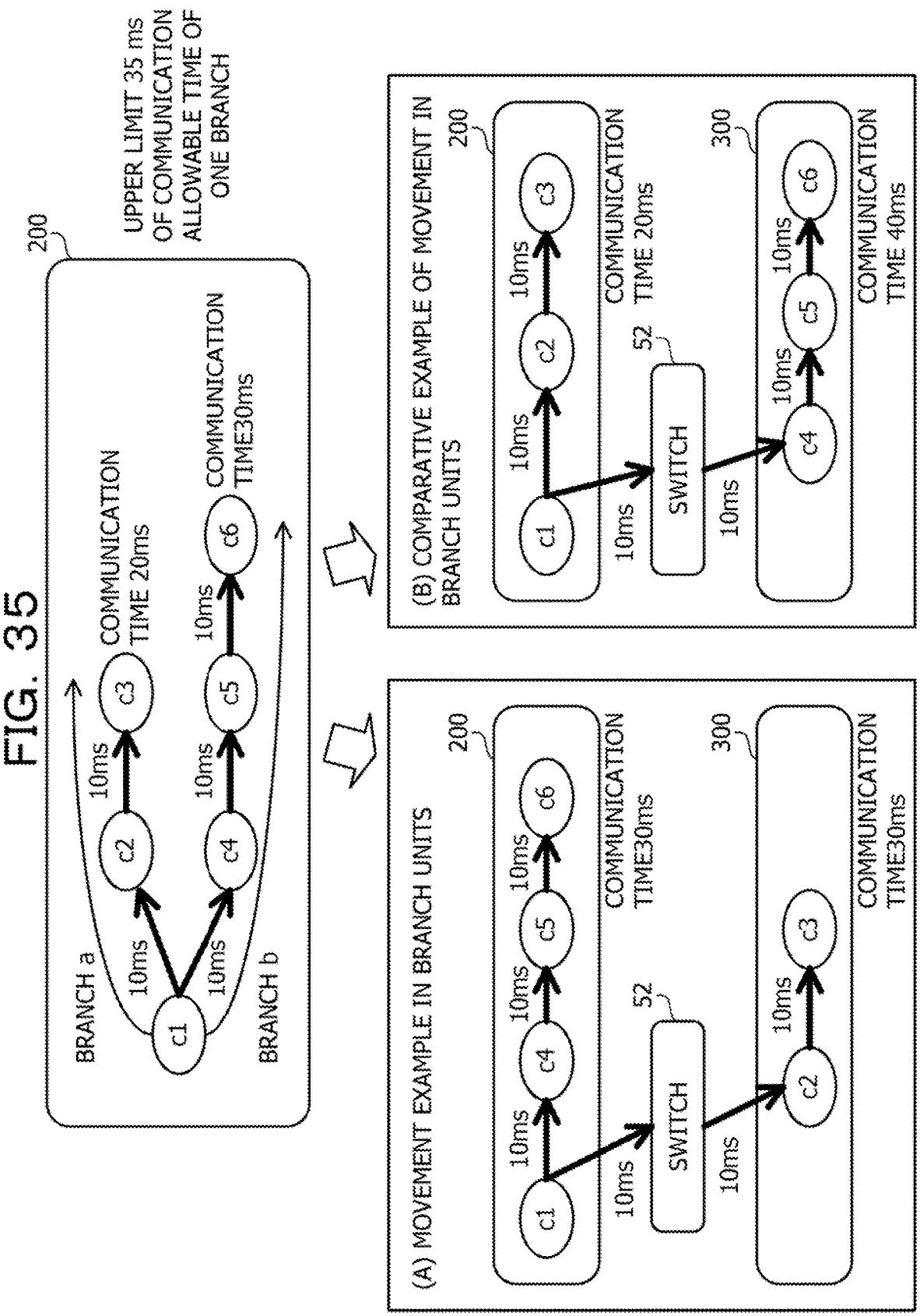
FIG. 35 is a diagram illustrating an example of selecting a moving target branch.

FIG. 35 is a diagram illustrating an example of selecting a moving target branch.

For example, a case is considered where containers c1 to c6 are executed on the server 200. The container c1 calls the containers c2 and c4. The container c2 calls the container c3. The container c4 calls the container c5. The container c5 calls the container c6. The containers c1 to c3 form a branch a. The containers c1, c4, c5, and c6 form a branch b.

For example, it is assumed that an upper limit of a communication allowable time associated with the cooperation between the containers in each of the branches a and b be 35 ms. The upper limit is determined in advance according to the quality standard of service provision.

A communication time associated with cooperation between the containers c1 and c2 is 10 ms. A communication time associated with cooperation between the containers c2 and c3 is 10 ms. Therefore, a communication time associated with the cooperation between the containers in the branch a is 10 ms+10 ms=20 ms (<35 ms).

A communication time associated with cooperation between the containers c1 and c4 is 10 ms. A communication time associated with cooperation between the containers c4 and c5 is 10 ms. A communication time associated with cooperation between the containers c5 and c6 is 10 ms. Therefore, a communication time associated with the cooperation between the containers in the branch b is 10 ms+10 ms+10 ms=30 ms (<35 ms).

Here, it is assumed that a communication time needed for communication between the server 200 and the switch 52 be 10 ms. Furthermore, it is assumed that a communication time needed for communication between the server 300 and the switch 52 be 10 ms.

The number of edges included in the branch a is two. The number of edges included in the branch b is three. Therefore, the number of edges included in the branch a is smaller than the number of edges included in the branch b. Furthermore, the number of edges included in a container group except for the nodal node in the branch a is one. The number of edges included in a container group except for the nodal node in the branch b is two. Therefore, the number of edges included in the container group except for the nodal node in the branch a is smaller than the number of edges included in the container group except for the nodal node in the branch b.

FIG. 35(A) illustrates an example in which the management device 100 moves the containers c2 and c3 that belong to the branch a from the server 200 to the server 300. A communication time associated with the cooperation between the containers in the branch b is 30 ms (<35 ms). On the other hand, due to the movement of the containers c2 and c3, a communication time associated with the cooperation between the containers in the branch a is set as ms+10 ms+10 ms=30 ms. In this case, the communication time associated with the cooperation between the containers in the branch a can be suppressed within the upper limit 35 ms of the communication allowable time.

FIG. 35(B) illustrates an example in which the management device 100 moves the containers c4 to c6 that belong to the branch b from the server 200 to the server 300. A communication time associated with the cooperation between the containers in the branch a is 20 ms (<35 ms). On the other hand, due to the movement of the containers c4 to c6, the communication time associated with the cooperation between the containers in the branch b is set as ms+10 ms+10 ms+10 ms=40 ms. In this case, it is not possible to suppress the communication time associated with the cooperation between the containers in the branch b within the upper limit 35 ms of the communication allowable time.

In this way, when the moving candidate branch having the largest number of edges, in other words, for example, the largest number of consecutive microservices among the moving candidate branches is moved to another server, the possibility increases that it is not possible to suppress the communication time associated with the cooperation between the containers within the upper limit of the communication allowable time.

Therefore, by preferentially selecting the moving candidate branch that has the smaller number of edges among the moving candidate branches as a moving target, the management device 100 can further suppress the increase in the communication delay time caused by the movement of the containers. As a result, for example, a state can be suppressed where it is not possible to respond to a request from a client for a service and a timeout occurs.

Note that, in the description of the second embodiment, as the load capacity to be compared with the load capacity of the container, the load capacity of the server, in other words, for example, the physical machine is used. However, the load capacity of the virtual machine may be used. For example, the load capacity used for the comparison in steps S17, S22, S32, S34, and the like, may be the load capacity of the virtual machine. For example, because resources of the server that is the physical machine are allocated to the virtual machine, the load capacity of the virtual machine can be converted into the load capacity of the server that operates the virtual machine.

Summarizing the above, the management device 100 according to the second embodiment has the following functions, for example.

The management device 100 acquires the topology information indicating the calling relationship between containers of the plurality of containers that operates on the server (in other words, for example, first information processing device). On the basis of the topology information, the management device 100 moves a container group, connected by a calling relationship between a second container that is one of callees of a first container that calls two or more containers and a third container that does not call other containers, to the other server (in other words, for example, second information processing device).

In this way, as illustrated in FIG. 34A, by deciding the container group to be moved in branch units, it is possible to suppress the frequency of the communication between the servers associated with the cooperation between the containers and to suppress the increase in the communication delay time. In particular, for example, the first container corresponding to the nodal node is excluded from the moving target. Therefore, it is possible to suppress the increase in the frequency of the communication between the servers.

For example, the moving container determination unit 170 specifies a third container (end point node) on the basis of the topology information and specifies a first container (nodal node) and a second container by tracing a caller from the third container.

This allows the branch to be efficiently specified. After specifying the first branch having the third container as an end point node, the moving container determination unit 170 further traces the caller from a nodal node of the first branch and specifies a fourth container (nodal node) that calls two or more containers. Then, the moving container determination unit 170 acquires another container group included in a second branch from a fifth container that is one of callees of the fourth container, to the first container, the second container, and the third container. As a result, the moving candidate branch included in the topology or the moving candidate container group included in the branch can be appropriately acquired.

For example, the moving container determination unit 170 specifies one or more third containers (end point node) on the basis of the topology information and acquires the plurality of moving candidate container groups by tracing the caller from each of the one or more third containers. The moving container determination unit 170 selects a moving target container group from among the plurality of moving candidate container groups on the basis of a predetermined condition such as the number of edges. As a result, the moving target container group can be appropriately acquired.

Furthermore, in a case where the plurality of servers that is a moving destination candidate of the container group exists, the container moving unit 190 moves the plurality of container groups that has the first container in common to the same moving destination server. By moving the plurality of container groups that has the nodal node, in other words, for example, the first container in common to the same server, it is possible to further suppress the increase in the frequency of the communication between the servers.

In the topology information, a calling relationship between containers is represented by an edge. The moving container determination unit 170 extracts a plurality of moving candidate container groups on the basis of the topology information. The moving container decision unit 180 preferentially selects the container group that has fewer edges from among the plurality of moving candidate container groups as a moving target.

As a result, as illustrated in FIG. 35(A), the increase in the communication time due to the cooperation between the containers can be suppressed, and for example, a timeout of a service response can be suppressed.

Furthermore, the moving container determination unit 170 extracts the plurality of moving candidate container groups from among the plurality of containers connected by the continuous calling relationship, that is, for example, the duster on the basis of the topology information. The moving container determination unit 170 excludes a first container group that has the largest number of edges and a second container group that includes at least one container Included in the first container group among the plurality of moving candidate container groups from the moving candidates.

The first container group is a relatively large branch in the duster. Therefore, to move the first container group and the second container group that is associated with the first container group to another server has a relatively large effect on the cooperation between the containers, and deterioration in the response time caused by the communication delay time may be excessive. Therefore, by suppressing the movements of the first container group and the second container group, it is possible to suppress the increase in the frequency of the communication between the servers associated with the cooperation between the plurality of containers that belongs to the same duster, and it is possible to suppress the increase in the response time of the service caused by the communication delay.

Alternatively, the moving container determination unit 170 may set the moving priorities of the first container group that has the largest number of edges and the second container group that includes at least one container included in the first container group among the plurality of moving candidate container groups to be lower than that of a third container group that does not include the containers included in the first container group.

As described above, the first container group is a relatively large branch in the duster. Therefore, to move the first container group and the second container group that is associated with the first container group to another server has a relatively large effect on the cooperation between the containers, and deterioration in the response time caused by the communication delay time may be excessive. Therefore, by lowering the moving priorities of the first container group and the second container group, it is possible to suppress the increase in the frequency of the communication between the servers due to the cooperation between the plurality of containers that belongs to the same duster, and it is possible to suppress the increase in the communication delay time.

Furthermore, in a case where the plurality of second container groups exists, the moving container determination unit 170 may decide the moving priority of each of the plurality of second container groups on the basis of the number of containers included in the first container group included in each of the plurality of second container groups. For example, the moving container determination unit 170 lowers the moving priority as the number of containers included in the first container group included in the second container group is larger. This suppresses the movement of the containers included in the first container group, and it is possible to suppress the increase in the frequency of the communication between the servers due to the cooperation between the plurality of containers that belongs to the same duster, and it is possible to suppress the increase in the response time of the service caused by the communication delay.

Furthermore, in a case where the plurality of servers that is a moving destination candidate of the container group exists, the container moving unit 190 extracts the second container group including some container groups of the first container group obtained by tracing the caller from the third container (end point node) in the first container group. The container moving unit 190 moves another second container group that includes at least one container included in the some container groups and has the first container (nodal node) in common to the extracted second container group and the second container group to the same server.

By moving the plurality of container groups that has the nodal node, in other words, for example, the first container in common to the same server, it is possible to further suppress the increase in the frequency of the communication between the servers.

Moreover, in a case where the plurality of servers that is a moving destination candidate of the container group exists, the container moving unit 190 preferentially selects a server that includes fewer relay devices such as the switch and the router existing in the communication path to the moving source server as a moving destination. As a result, an increase in the communication delay caused by the communication through the relay device can be suppressed, and an increase in the service response time due to the communication delay can be suppressed. As a result, for example, the possibility that the timeout of the service response occurs due to the movement of the container can be reduced.

Note that the information processing according to the first embodiment may be implemented by causing the processing unit 12 to execute the program. Furthermore, the information processing according to the second embodiment can be implemented by causing the CPU 101 to execute the program. The program can be recorded in the computer-readable recording medium 43.

For example, the program can be distributed by distributing the recording medium 43 in which the program is recorded. Alternatively, the program may be stored in another computer and distributed via a network. For example, a computer may store (install) the program, which is recorded in the recording medium 43 or received from another computer, in a storage device such as the RAM 102 or the HDD 103, read the program from the storage device, and execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
    acquiring topology information that indicates a calling relationship between a plurality of containers that operates in a first information processing device, the calling relationship is represented as an edge in the topology information;
    identifying a second container, wherein the second container is called by the first container and wherein the second container calls two or more containers, and a third container that does not call another container based on the topology information;
    extracting a plurality of moving candidate container groups from among the plurality of containers connected by the continuous calling relationship on the basis of the topology information;
    excluding, from the moving candidates, a first container group that has the largest number of edges among the plurality of moving candidate container groups and a second container group that includes at least one container included in the first container group;
    selecting the container group that has fewest edges as a moving target from among the plurality of moving candidate container groups; and
    moving, to a second information processing device, the container group that is connected by a calling relationship from the second container to the third container.

2. The non-transitory computer-readable storage medium storing a program according to claim 1, wherein the process comprising:
    identifying the third container based on the topology information, and
    identifying the first container and the second container by tracing a caller, starting from the third container.

3. The non-transitory computer-readable storage medium storing a program according to claim 1, wherein the process comprising:
when moving destination candidates of the container group are two or more, identify one of the second information processing device from a plurality of second information processing devices,
moving, to the one of the second information processing device, a plurality of container groups that has the first container in common.

4. The non-transitory computer-readable storage medium storing a program according to claim 1, wherein
the calling relationship between the containers is represented as an edge in the topology information, and
the process comprising:
extracting a plurality of moving candidate container groups based on the topology information.

5. The non-transitory computer-readable storage medium storing a program according to claim 4, wherein the process comprising:
extracting the plurality of moving candidate container groups from the plurality of containers connected by the continuous calling relationship based on the topology information, and
setting moving priorities of a first container group that has the largest number of edges and a second container group that includes at least one container included in the first container group among the plurality of moving candidate container groups to be lower than that of a third container group that does not include the container included in the first container group.

6. A container moving method performed by a computer, comprising:
acquiring topology information that indicates a calling relationship between a plurality of containers that operates in a first information processing device, the calling relationship is represented as an edge in the topology information;
identifying a second container, wherein the second container is called by the first container and wherein the second container calls two or more containers, and a third container that does not call another container based on the topology information;
extracting a plurality of moving candidate container groups from among the plurality of containers connected by the continuous calling relationship on the basis of the topology information;
excluding, from the moving candidates, a first container group that has the largest number of edges among the plurality of moving candidate container groups and a second container group that includes at least one container included in the first container group;
selecting the container group that has fewest edges as a moving target from among the plurality of moving candidate container groups; and
moving, to a second information processing device, the container group that is connected by a calling relationship from the second container to the third container.

7. The container moving method according to claim 6, wherein the container moving method further comprising:
identifying the third container based on the topology information, and
identifying the first container and the second container by tracing a caller, starting from the third container.

8. The container moving method according to claim 6, wherein the container moving method further comprising:
when moving destination candidates of the container group are two or more, identify one of the second information processing device from a plurality of second information processing devices,
moving, to the one of the second information processing device, a plurality of container groups that has the first container in common.

9. The container moving method according to claim 6, wherein
the calling relationship between the containers is represented as an edge in the topology information, and
the container moving method further comprising:
extracting a plurality of moving candidate container groups based on the topology information.

10. The container moving method according to claim 9, wherein the container moving method further comprising:
extracting the plurality of moving candidate container groups from the plurality of containers connected by the continuous calling relationship based on the topology information, and
setting moving priorities of a first container group that has the largest number of edges and a second container group that includes at least one container included in the first container group among the plurality of moving candidate container groups to be lower than that of a third container group that does not include the container included in the first container group.

11. The container moving method according to claim 10, wherein the container moving method further comprising
deciding the moving priority of each of a plurality of the second container groups based on the number of containers included in the first container group included in each of the plurality of second container groups.

12. The container moving method according to claim 6, wherein the container moving method further comprising
in a case where a plurality of the second information processing devices that is a moving destination candidate of the container group exists, selecting, as the moving destination, the second information processing device that has fewer relay devices that exists in a communication path to the first information processing device.

* * * * *